United States Patent [19]
Korszun

[11] Patent Number: 5,680,528
[45] Date of Patent: Oct. 21, 1997

[54] DIGITAL DRESSING ROOM

[76] Inventor: Henry A. Korszun, 302 Lexington Ave., New Haven, Conn. 06513

[21] Appl. No.: 248,351

[22] Filed: May 24, 1994

[51] Int. Cl.$^6$ .................................................... G06T 3/00
[52] U.S. Cl. ............................................ 395/135; 395/133
[58] Field of Search ................................. 395/129, 130, 395/133, 134, 135; 33/12, 15, 17 A, 17 R; 364/470

[56] References Cited

U.S. PATENT DOCUMENTS

| | | | |
|---|---|---|---|
| 4,539,585 | 9/1985 | Spackova et al. | 382/100 |
| 4,546,434 | 10/1985 | Gioello | 364/400 |
| 4,598,376 | 7/1986 | Burton et al. | 364/470 |
| 4,885,844 | 12/1989 | Chun | 33/15 |
| 4,899,448 | 2/1990 | Huang | 33/17 R |
| 4,916,624 | 4/1990 | Collins et al. | 364/470 |
| 4,916,634 | 4/1990 | Collins et al. | 364/470 |
| 4,926,344 | 5/1990 | Collins et al. | 364/470 |
| 4,949,286 | 8/1990 | Ohba | 395/125 |
| 5,060,171 | 10/1991 | Steir et al. | 395/135 |
| 5,163,006 | 11/1992 | Deziel | 364/470 |
| 5,247,610 | 9/1993 | Oshima et al. | 395/135 |
| 5,341,305 | 8/1994 | Clarino et al. | 364/470 |
| 5,363,476 | 11/1994 | Kurashige et al. | 395/125 |
| 5,495,568 | 2/1996 | Beavin | 395/161 |
| 5,615,318 | 3/1997 | Matsuura | 395/120 |

*Primary Examiner*—Heather R. Herndon
*Assistant Examiner*—Joseph R. Burwell
*Attorney, Agent, or Firm*—St. Onge Steward Johnston & Reens LLC

[57] ABSTRACT

A system of software programs and a database of digital images, including garment images and a basic model body image, which allows a client to select and "try on"—individually or by mixing and matching—the different garment images of the database. The system renders an image of the client's body in the garments, with the client's specific curves, bulges and height which reflect the client's body measurements. Broadly, the system is comprised of two parts: a preprocess and an online process. The preprocess prepares the images for inclusion in the database and addresses the following issues: photographing and digitizing the images, deriving stencils of the images, correcting image mis-alignments, centering the basic model body, detaching the arms/sleeves of the images, classifying garments, and others. The online process, which employs image processing techniques including geometric transformations (such as digital warping), translations, rotations, edge detection, and others, takes as user inputs the client's measurements—bust, waist, hips, and height, for example—and the selected garments; it then layers the garment(s), thus creating an ensemble, transforms the basic model body to reflect the client's height, translates the ensemble unto the body reflecting the client's height, analyzes the amount of garment ease in the ensemble, reshapes the torso of the clad body to show the client's girths, calculates the trigonometric functions used to re-attach untransformed arms/sleeves, and then attaches arms/sleeves unto the reshaped torso. The result is a rendering of a clothing ensemble as it would drape a body with the client's measurements.

34 Claims, 30 Drawing Sheets

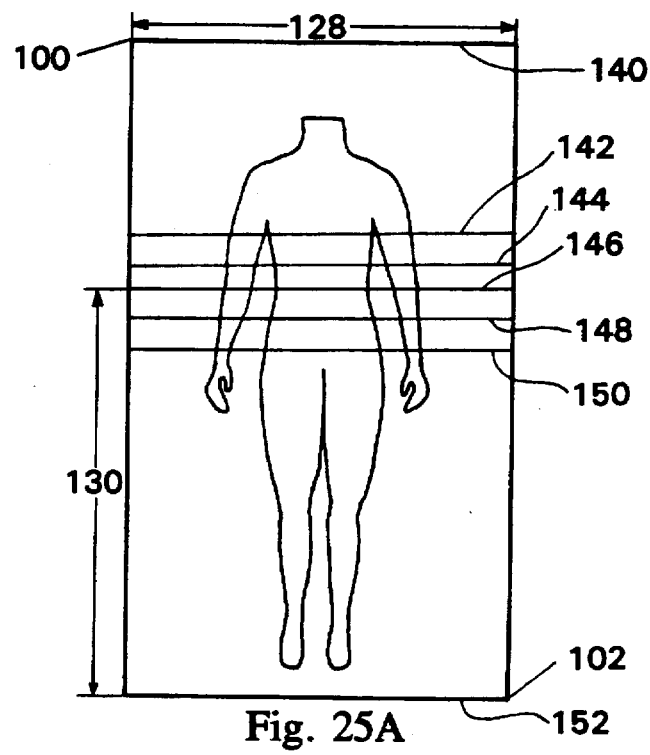
Fig. 25A
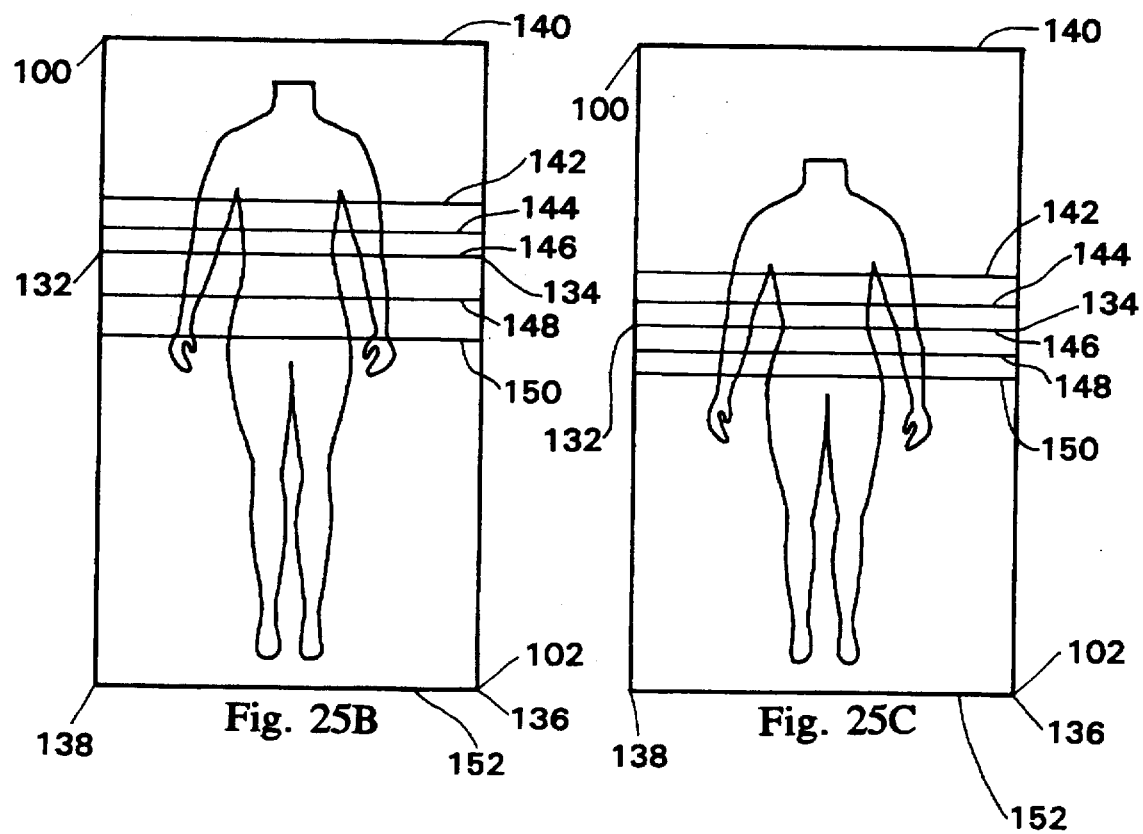
Fig. 25B
Fig. 25C

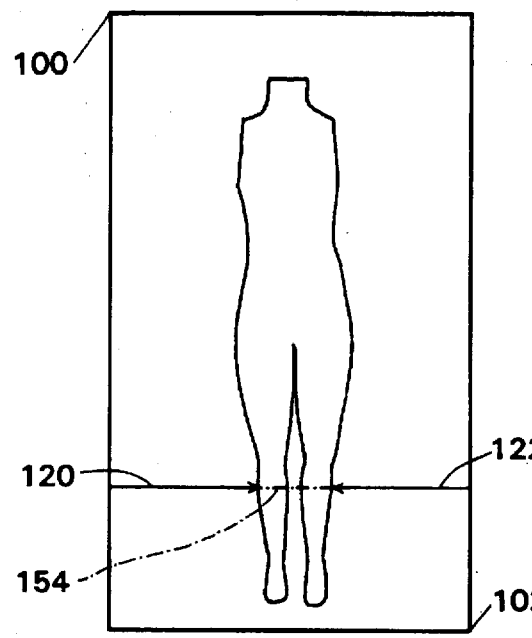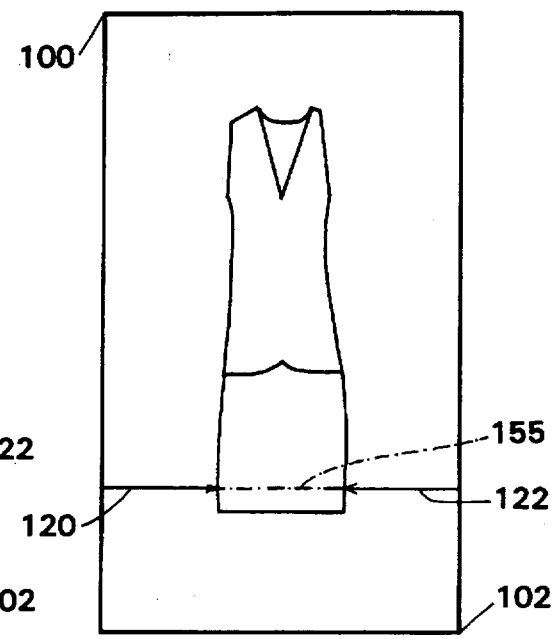
Fig. 26A  Fig. 26B
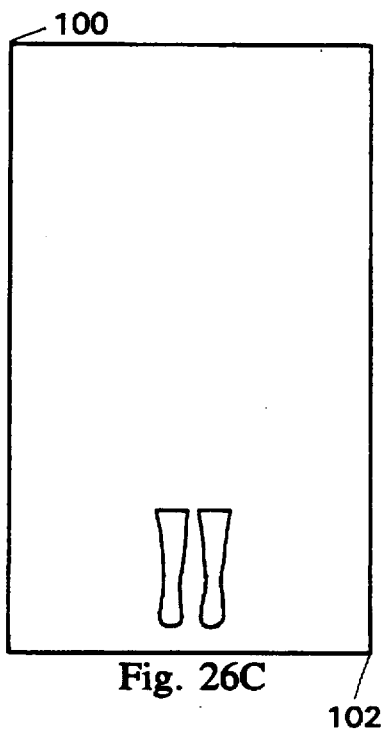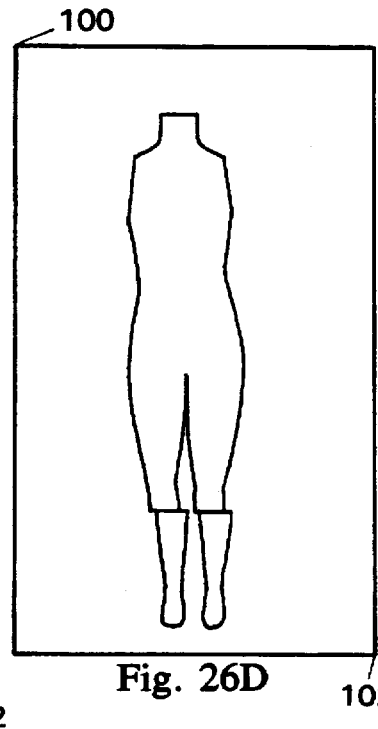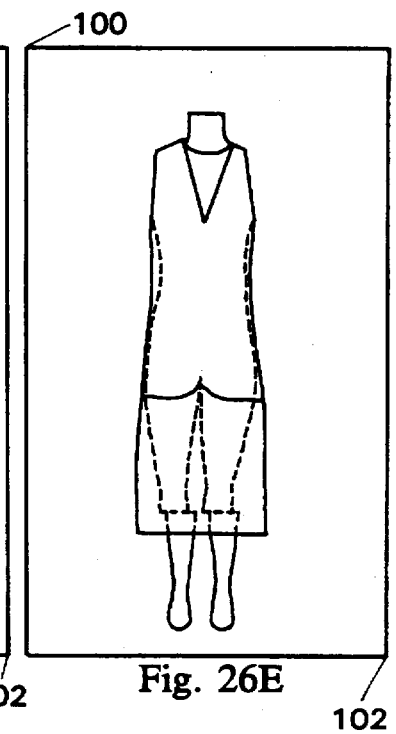
Fig. 26C  Fig. 26D  Fig. 26E

Fig. 40

Reference Numerals

The following list contains a brief description of the reference numerals as they are used in the drawing figures.

100    X = 0, Y = 0 (origin pixel)
102    X = width of bitmap − 1, height = height of bitmap − 1 (last pixel)
106    trimmed area
108    translated/rotated area
110    left detachment vector
110.1    upper end point of left detachment vector (upperleftx, upperlefty)
110.2    lower end point of left detachment vector (lowerleftx, lowerlefty)
111    distorted left detachment vector
112    right detachment vector
112.1    upper end point of right detachment vector (upperrightx, upperrighty)
112.2    lower end point of right detachment vector (lowerrightx, lowerrighty)
113    distorted right detachment vector
114    other vectors
116    uppercutline
118    lowercutline
120    scan left to right
122    scan right to left
123    secondlength
124    warpline
125    firstlength
126    first source control point
128    width of source rectangle
130    height of source rectangle
132    first destination control point
134    second destination control point
136    third destination control point
138    fourth destination control point
140    first line of bitmap
142    bust line (girth measurement location)
144    midriff line (girth measurement location)
146    waist line (girth measurement location)
148    abdomen line (girth measurement location)
150    hip line (girth measurement location)
152    last line of bitmap
154    dresscan + modelyshift
155    dressscan
156    thick line (source)
158    thin line (destination)
160    X = upperleftcut, Y = uly (upper left "hit" of unwarped ensemble)
162    X = middleleftcut, Y = mly (middle left "hit" of unwarped ensemble)
164    X = lowerleftcut, Y = lly (lower left "hit" of unwarped ensemble)
166    X = ulx, Y = uly (upper left "hit" of warped ensemble)
168    X = mlx, Y = bodycut[1] (middle left "hit" of warped ensemble)
170    X = llx, Y = lly (lower left "hit" of warped ensemble)
172    line intersecting lly and lying parallel to X axis
174    height of left triangle in unwarped ensemble
176    X = upperleftcut, Y = lly
178    angle in unwarped ensemble (expressed in radians)
180    angle in warped ensemble (expressed in radians)
182    line defined by X = ulx, Y = uly and X = mlx, Y = bodycut[1]
184    condx
186    height of left triangle in warped ensemble

DIGITAL DRESSING ROOM

BACKGROUND OF THE INVENTION

This invention is a system of software programs and digital images which allows a client to "try on" clothing with a computer serving as a "digital mirror".

My research indicates that there is a product that was developed in the mid-1980's which might in some ways be considered a precursor to the system that I have developed. Magic Mirrors, as this product is called, is essentially a collection of photographic slides of human forms dressed in clothing ensembles. These slides are projected onto a device where a client's face is already being displayed. This composite display of the client's face and the projected slide of the ensemble supposedly gives the client an idea of how he/she will look in the ensemble without physically trying on the clothes and viewing himself in the mirror.

A major deficiency of this product is that it establishes no relationship between the clothing ensemble and the client's specific body measurements. For example, a client with measurements 104 cm bust, 57 cm waist and 109 cm hips will look very much like—with the notable exception of the face—a client with measurements 80/81/109 cm. This might not be a major issue in very loose-fitting clothing whose purpose is to disguise the underlying physique—as in a heavy, wool-weave, tent-like shift dress, for example. But in styles that are more closely fitting, and in fabrics that cling and hug, the client's underlying body and its relationship to the clothing ensemble become much more important in rendering a realistic facsimile.

Another major deficiency of the Magic Mirrors product is that all of the ensembles in that system are predetermined—there are no provisions for mixing and matching. The following example should help clarify this point:

Assume that Magic Mirrors has ensembles A, B, and C in its inventory, and

Ensemble A is comprised of DRESS 500 and TOP 700;

Ensemble B is comprised of DRESS 501 and TOP 701;

Ensemble C is comprised of SKIRT 300 and TOP 702.

Suppose that a client wished to "try on" DRESS 500 and TOP 702, which I will call Ensemble D. Since Ensemble D is not currently in the system's inventory, the only way to satisfy the client's request would be to add another static ensemble to the inventory. As can easily be gleaned from this example, the potential permutations in creating ensembles beyond a simple few static combinations are vast. Under the Magic Mirrors approach, allowing for numerous static ensembles implies costly and time-consuming planning and execution.

A third major problem with the Magic Mirrors product is that its images are not in digital format. This fact contributes heavily to the first two deficiencies described above since it is awkward and cumbersome to manipulate non-digital data. Furthermore, unwieldy projecting equipment, large stationary display apparatus, and daunting space requirements also conspire to make this type of system costly and not particularly portable. The logistics of bringing this type of system into the home are particularly imposing.

BRIEF DESCRIPTION OF THE DRAWINGS

The following list contains brief descriptions of all of the drawing figures that are used in this specification. To get a complete understanding of the processes used in this system, the drawing figures should be considered within the context of any related text. Thus neither this list alone, nor the drawing figures themselves, should be viewed as an alternative to reading the textual part of this specification. Please note also that the numbering sequence of the figures should not be construed as prescribing any particular sequence to processing events, except as noted.

FIG. 6A also illustrates the arms/sleeves being detached in a composite image having a pose with the arms slightly extended; FIG. 6B depicts the arms/sleeves being detached in a pose with the arms hanging straight.

FIGS. 7B and 8B also illustrate trimming any extraneous flesh from the images. These figures illustrate an implementation which uses single detachment vectors. See also Table B.

FIG. 25A illustrates the misses basic model body; FIG. 25B gives an example of a client body that is taller than the model body; FIG. 25C shows a client body that is shorter than the model body. The figures indicate girth measurement locations. FIG. 25A also shows the source rectangle which is used in warping to render bodies of differing heights. Likewise, FIGS. 25B and 25C indicate destination quadrilaterals.

FIG. 26A shows how to scan the client body bitmap at dressscan+modelyshift left to right and right to left to find its leftmost and rightmost X's.

FIG. 26B shows how to scan the ensemble (as from FIG. 20) at dressscan left to right and right to left to find its leftmost and rightmost X's.

FIG. 26C shows the region of the client bitmap from Y=dressscan+modelyshift down to the end of the bitmap; this bitmap region is copied into a buffer bitmap called "legs" and translated by xdiff pixels, the result being "centered" legs.

FIG. 26D shows the client body bitmap down to Y=dressscan+modelyshift; below the Y line, the centered legs are copied to the client bitmap.

FIG. 26E illustrates the ensemble with the legs centered and extending correctly from under it.

FIG. 40 comprises a key for the reference characters used in the foregoing drawing figures.

SUMMARY OF THE INVENTION

Figure 1A:
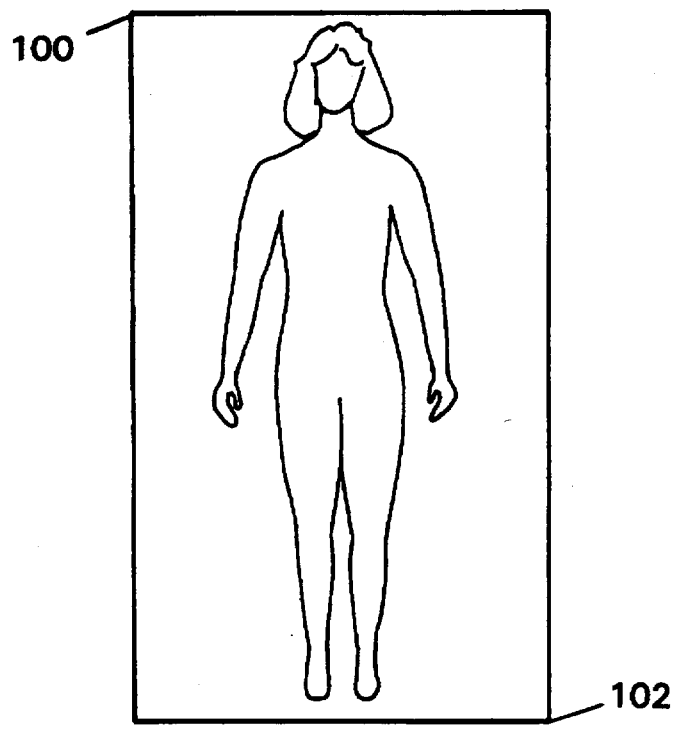
FIG. 1A shows the basic model as captured during a photography session.

As discussed above, the Magic Mirrors system does not take into account a client's specific body measurements and therefore establishes no relationship between the client's body and a clothing ensemble. At most, Magic Mirrors gives an approximation of how someone might look in a given ensemble.

This is in sharp contrast to the system that I have developed because my system first establishes a relationship between an ensemble and a client's body measurements and then renders an image which reflects that client's specific curves, bulges and height. Based on a few measurements, such as bust, waist, hips, and height, my system renders a photographic-quality realistic facsimile of how a client will look in an ensemble that he/she has selected from a digitized inventory of off-the-shelf styles. Assume, for example, Client A has the following body measurements—bust 80 cm, waist 81 cm, hips 109 cm and is 159 cm tall; assume further that Client A picks a skimpy, silk tight-fitting dress from the database. The system determines a relationship between the client's body (which might be described as a short "pear") and the dress and then renders an image specific to that body clad in the dress. It should be noted that the system itself makes no value judgments as to whether or not a given ensemble will "look good" on a client with a particular set of body measurements; this decision is left to the client herself. Contrast this with Client B whose girth measurements are 104/57/109 cm (an extreme hourglass shape) and whose height is 174 cm. Client B picks the same skimpy dress but the system creates a dramatically different rendering. Please note that my system need not be limited to only bust, waist and hip, and height measurements; it can easily accommodate additional measurements such as midriff, abdomen and inseam, if greater precision is needed. My main reason for concentrating on bust, waist, hips, and height was for simplicity and because these are the measurements that we conventionally refer to in the female form. It should be noted that my system is not restricted to adult female forms; it is also applicable to male adult forms and to children.

As already noted, the Magic Mirrors system does not allow mixing and matching of different tops and jackets with skirts and dresses—its ensembles are static and predetermined. My system, on the other hand, has no such limitation. Returning to the above example, if Client A cares to "try on" a jacket that fits loosely around the waist, she simply instructs the system to render her image using the jacket/dress combination ensemble. Likewise, Client B might like to "try on" different tops which might draw attention to her tiny waist. The important point here is that different combinations of garments could result in dramatically different renderings, given a particular set of measurements. See FIGS. 11A, 11B, 11C, and 11D for some examples; for further illustrations, contrast FIG. 36A with 36C and FIG. 36B with 36C. (Please note that the origin pixel of bitmap images in this system is at X=0, Y=0 100 and the last pixel is at X=width of bitmap−1, Y=height of bitmap−1 102.)

Another advantage of my system over Magic Mirrors is that my system is in digital format. Two basic features of my system—mixing and matching of garments and shaping ensembles to reflect bodies with particular client shapes—are effectively and efficiently accomplished using digital image processing techniques. As far as mixing and matching is concerned, some simple arithmetic should be instructive. Assume that a database of garment images has three tops and three dresses. Each dress in itself represents an ensemble (yielding 3 ensembles) plus mixing and matching the three dresses and three tops (3 times 3=9 ensembles) for a total of 12 ensembles. (This example assumes that the top by itself does not represent an ensemble).

Another important advantage to a digital format is that it easily lends itself to emerging technologies such as interactive catalogue shopping over some kind of digital network. This would be in addition to the most obvious application in which department stores could use my system as an alternative to conventional dressing rooms.

DETAILED DESCRIPTION OF THE PREFERRED EMBODIMENTS

A. Underlying Concepts

This part introduces some of the concepts that are used throughout this specification. In the Digital warping section I briefly discuss the image processing technique of geometric transformation; variations of this technique are used repeatedly throughout my system.

The Theory of girths section introduces the following concepts: the notion that a body of certain measurements belongs to a specific "body-type" classification; the concept that in any body classification there is a basic model body having a predetermined physique with specific body measurements, and that there are predictable variances (proportionate bodies) and non-predictable variances (disproportionate bodies) from this basic model body; the notion that a median size garment—within a classification—will ideally fit the basic model body of that classification; the idea that the variances also have ideal, non-median garment sizes; and the concept that disproportionate bodies (i.e., non-basic model and non-predictable variances) which meet certain classification criteria belong to the same classification as proportionate bodies which meet the criteria. In this section I provide a theory which indicates why the basic model body image within a classification is used as the point of departure in rendering images of non-basic bodies.

The Theory of height section discusses the idea that in a two-dimensional representation, a client body can be made to appear to be taller or shorter than a basic model body by geometrically transforming the model body from the waist down, thereby creating the optical illusion of differing heights.

Finally, I briefly discuss the basic model body's measurements in The misses prototype section.

B. Digital Warping

In my system, ensembles are shaped to conform with the measurements of a client's body by an image processing technique called digital warping. Briefly, by changing the spatial relationship between pixels in a source image through certain rules and equations, this source image is geometrically transformed (warped) into a destination image. Historically, geometric transformations have typically been used in images which had undergone distortion to restore them to their original. Recently, similar techniques have been used to achieve special effects by warping an undistorted image into a distorted image to get some special effect. Digital morphing is one of the more widely known examples.

C. Theory of Girths

Please assume that the human form can be thought of as belonging to a specific classification; as far as the female form is concerned, it might be classified as a misses body, a women's body, a juniors body, etc., for example. A main postulate of my system is that there exists a basic model body for each of these classifications so that there is a basic model misses body, a basic model women's body and a basic model junior's body, for example. A further postulate is that for each of these basic model bodies, there is a garment size that results in an "ideal" fit. Suppose, for example, that a particular garment comes in the following sizes: median, median minus 1, median minus 2, median minus 3, median plus 1, median plus 2, and median plus 3. In my system, the basic model body (within a particular body classification) would pick the median size garment for the ideal fit.

A further postulate is that for each body classification there exist variances from the basic model body. On the one hand, predictable variances are well-proportioned and correspond to one of the above sizes; on the other hand, non-predictable variances are more or less disproportionate, but nonetheless are correctly associated with an appropriate size. Insofar as predictable variances are concerned, it might be said that for any body classification, there exist the following predictable body variances: basic model minus 1, basic model minus 2, basic model minus 3, basic model plus 1, basic model plus 2, and basic model plus 3 bodies. The ideal sizes for each of these predictable variances would be median minus 1, median minus 2, median minus 3, median plus 1, median plus 2, and median plus 3, respectively. Please note that this prototype system has been developed with 24 predictable variances (see Table A); since most off-the-shelf clothing does not come in 25 sizes (for the basic model body and the 24 variances), a certain size often will accommodate a range of variances.

With the above postulates in mind, my theory can be stated as follows: within any specific classification, there is a higher probability that the basic model body, clad in median size garment(s) for that classification, will have more in common visually and physically with all variances, clad in their respective ideal size garment(s), than the probability that any one variance will have more in common with the other bodies within the classification.

For practical purposes, what this means is that once a client body has been categorized as belonging to a particular classification (i.e., misses, juniors, women's, etc.), the basic model body, clad in median size garment(s) for that classification, will serve as the point of departure, i.e., the source image, in rendering images of any non-model client body, i.e., the destination image, within that classification. Furthermore, this basic model body source image serves as the same point of departure for renderings of both proportionate bodies, i.e., the predictable variances, as well as for disproportionate bodies, i.e., the non-predictable variances. Thus when a database is being created for a particular classification (misses, junior's, etc.) it is always the median size garment(s) on the basic model body of that particular classification that would serve as the point of departure in creating renderings of clients whose bodies have been categorized as belonging to that classification. It should be noted that a system need not necessarily conform to what might be considered standard department store/designer classifications; the important point is that within a classification, there is a basic model body whose ideal size is the median size.

D. Theory of Height

Figure 38A:
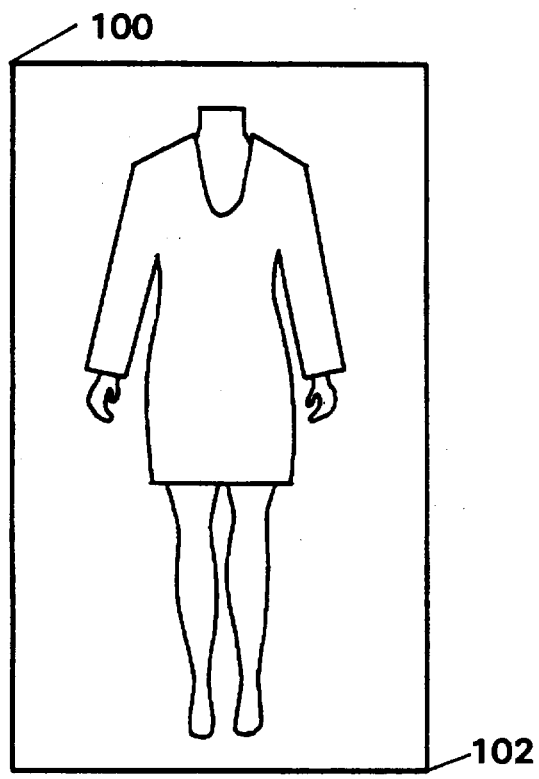
FIG. 38A illustrates a tall body in a minidress.
Figure 38B:
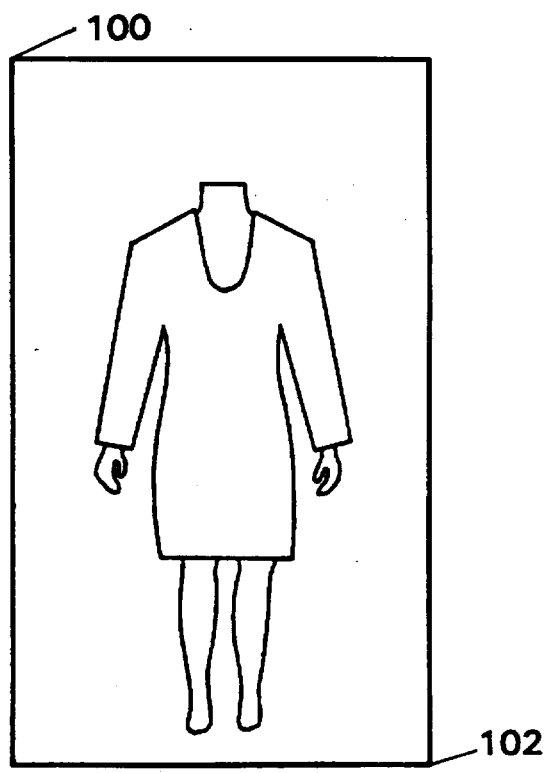
FIG. 38B illustrates a short body in the same minidress.

As proposed in the Theory of girths section above, a main postulate of my system is that there exists a basic model body within any body classification. As will become clear below there is an important difference between the way an image of the basic model body, clad in the median size garment(s), is reshaped to reflect a client's girths and the way the basic model body is elongated or shrunk to reflect a client's height. Stated briefly, the basic model body is adjusted (geometrically transformed) from the waist down in rendering a client's height while the torso (above the waist) remains unwarped. My process assumes that in a two-dimensional representation, adjusting the height from the waist to the toes is sufficient to create the optical illusion of different heights, and that it is unnecessary to adjust the total height (i.e., from the head to the toes). See FIGS. 25B and 25C for examples of bodies with heights differing from that of the basic model body (FIG. 25A). The illusion of differing heights is particularly apparent in ensembles where the hemline is a stylistic focal point, with more or less leg exposed. FIG. 38A depicts a tall body wearing a "minidress", while FIG. 38B shows the same dress on a shorter body.

E. The Misses Prototype

The prototype system that I have developed for this specification can be broadly called a misses classification. In this system, the basic model body has the following girth measurements: bust 92 cm, midriff 73 cm, waist 69 cm, abdomen 86 cm and hips 97 cm, and height 169 cm. Most experts would agree that these measurements reflect a well-proportioned misses body that is fully developed. See Table A for a listing of the various other misses girth measurements. Insofar as height is concerned, the misses range has been set from 159 to 179 cm.

TABLE A

The ranges for "misses" bodies of various girths are as follows: busts from 80 cm to 104 cm, midriffs from 61 cm to 85 cm, waists from 57 cm to 81 cm, abdomens from 74 cm 98 cm, and hips from 85 cm to 109 cm. The chart below shows a list of "misses" girths ranging from the basic model body (variance 12) to the smallest in decrements of 1 cm and from the basic model body to the largest in increments of 1 cm.

| VARIANCE | BUST | MIDRIFF | WAIST | ABDOMEN | HIPS | SIZE |
| --- | --- | --- | --- | --- | --- | --- |
| 0 | 80 | 61 | 57 | 74 | 85 | MEDIAN − 3 |
| 1 | 81 | 62 | 58 | 75 | 86 | MEDIAN − 3 |
| 2 | 82 | 63 | 59 | 76 | 87 | MEDIAN − 3 |
| 3 | 83 | 64 | 60 | 77 | 88 | MEDIAN − 3 |
| 4 | 84 | 65 | 61 | 78 | 89 | MEDIAN − 2 |
| 5 | 85 | 66 | 62 | 79 | 90 | MEDIAN − 2 |
| 6 | 86 | 67 | 63 | 80 | 91 | MEDIAN − 2 |
| 7 | 87 | 68 | 64 | 81 | 92 | MEDIAN − 1 |
| 8 | 88 | 69 | 65 | 82 | 93 | MEDIAN − 1 |
| 9 | 89 | 70 | 66 | 83 | 94 | MEDIAN − 1 |
| 10 | 90 | 71 | 67 | 84 | 95 | MEDIAN |
| 11 | 91 | 72 | 68 | 85 | 96 | MEDIAN |
| 12 | 92 | 73 | 69 | 86 | 97 | MEDIAN (Basic Model Body) |
| 13 | 93 | 74 | 70 | 87 | 98 | MEDIAN |
| 14 | 94 | 75 | 71 | 88 | 99 | MEDIAN |
| 15 | 95 | 76 | 72 | 89 | 100 | MEDIAN + 1 |
| 16 | 96 | 77 | 73 | 90 | 101 | MEDIAN + 1 |
| 17 | 97 | 78 | 74 | 91 | 102 | MEDIAN + 1 |
| 18 | 98 | 79 | 75 | 92 | 103 | MEDIAN + 2 |
| 19 | 99 | 80 | 76 | 93 | 104 | MEDIAN + 2 |
| 20 | 100 | 81 | 77 | 94 | 105 | MEDIAN + 2 |
| 21 | 101 | 82 | 78 | 95 | 106 | MEDIAN + 3 |
| 22 | 102 | 83 | 79 | 96 | 107 | MEDIAN + 3 |
| 23 | 103 | 84 | 80 | 97 | 108 | MEDIAN + 3 |
| 24 | 104 | 85 | 81 | 98 | 109 | MEDIAN + 3 |

Figure 37A:
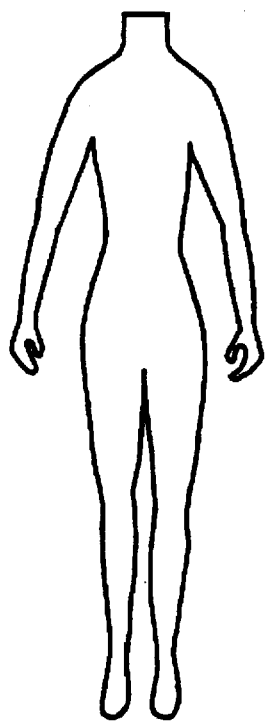
FIG. 37A depicts a lanky hourglass (variance 0).
Figure 37B:
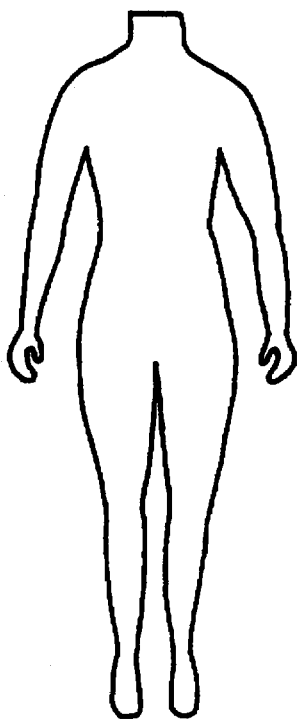
FIG. 37B depicts the basic model body (variance 12).
Figure 37C:
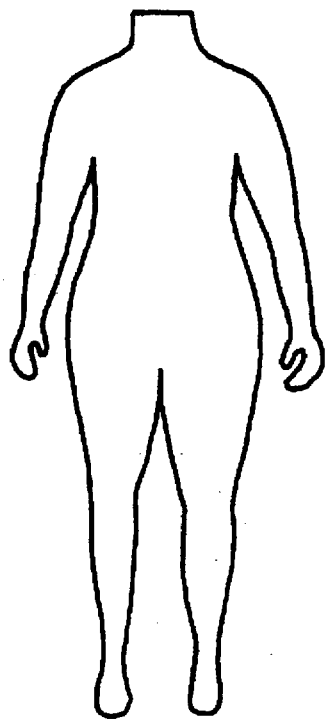
FIG. 37C depicts a boxy hourglass (variance 24).

(It should be noted that the girths from any given row in the above chart would result in a so-called hourglass figure—small waist, larger bust, still larger hips. But as the measurements get smaller, the hourglass shape becomes more and more lanky, whereas the hourglass shape becomes more boxy as the measurements grow larger. FIGS. 37A through 37C illustrate three proportioned bodies—a lanky hourglass (variance 0, FIG. 37A), the misses basic model body (variance 12, FIG. 37B), and a boxy hourglass (variance 24, FIG. 37C)).

F. The Pre-process

Figure 39A:
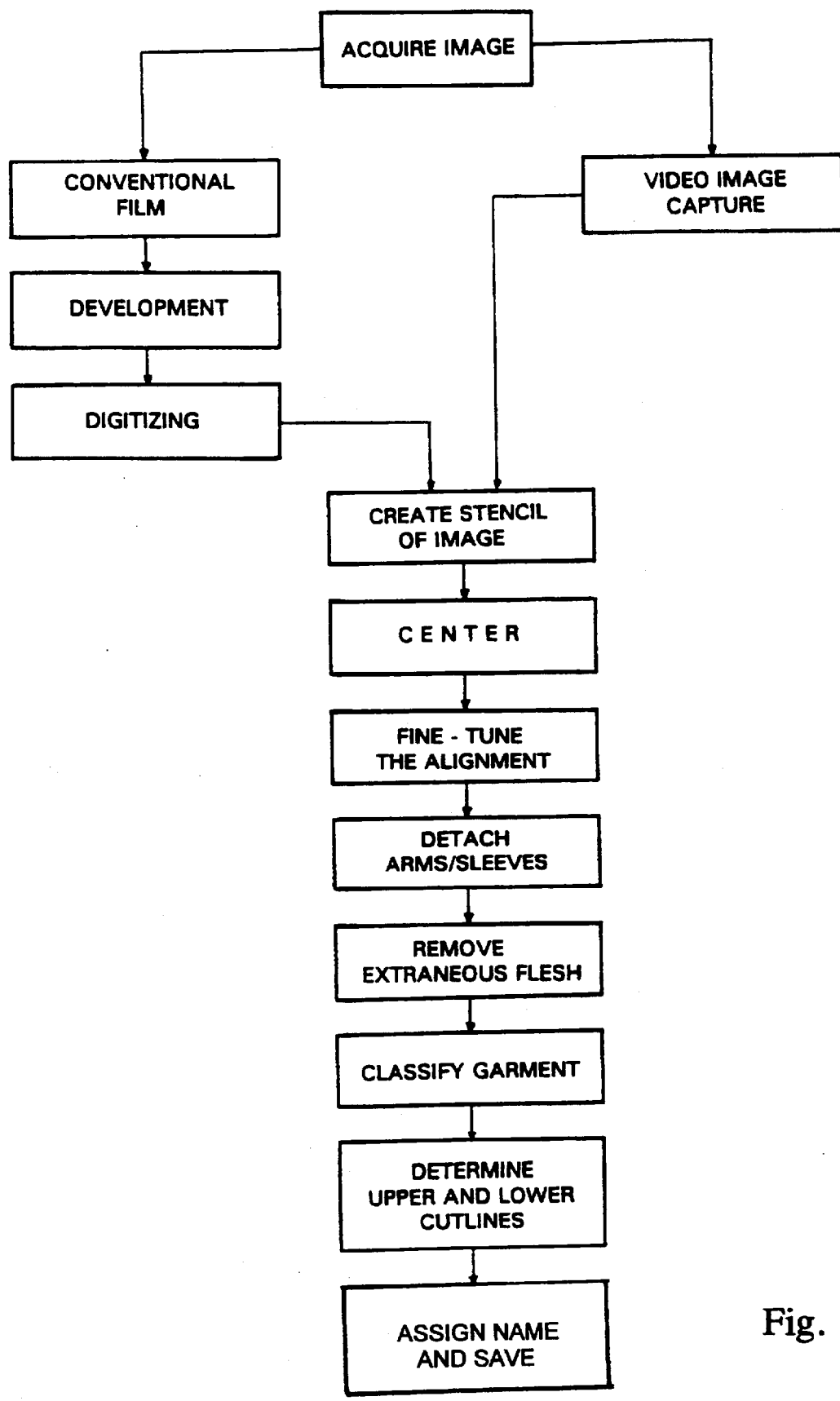
FIG. 39A is a flow chart which outlines the processes which are described in THE PRE-PROCESS.

A fundamental feature of my system is that images captured for inclusion into the database are preprocessed prior to their final inclusion. Pre-processing issues include photographing and digitizing the images, deriving stencils of the images, correcting image misalignments, centering the basic model body, detaching the arms/sleeves of the images, classifying garments, and others. Please note that I do not prescribe any particular sequence to the processing events, except as noted. See also FIG. 39A for a summary outline of the pre-process.

G. The Raw Images

In order for my system to operate effectively, it is important to acquire the garment images and the basic model body image correctly. A clean, nude basic model body, free of accessories and undergarments, is ideal because a nude body is the natural starting point of any dressing protocol. In my prototype system a nude misses basic model body is recommended because the basic model body image is the image upon which all other images are layered. It is not necessary that the basic model body be an image of a "real" person. Indeed, the basic model body could very well be a mannequin or some other form that 1) has the correct median girth measurements for its classification (e.g., for misses, variance 12 in Table A), 2) has the correct height for its classification (e.g., 169 cm for misses), and 3) has a natural human posture and appearance when clad in the garments that will be included in the database.

Since all garment images will be layered on the basic model body, it is important to capture both the basic model body image and the garment images in a manner that will facilitate future layering. An effective way to do this is to position both the camera and the basic model body in a controlled studio setting; the same studio configuration can then be used in all photography sessions where garment-capturing will be the objective. The important point is that all images in the database should be correctly aligned to all other images in the database; this could be achieved by aligning all garment images to the basic model body image.

Images are captured either by using a still camera or a video camera. If conventional film photography is used, the exposed film is first commercially developed and then the negatives, prints or slides can be digitized using a commercial scanning system. Some care should be taken in feeding these photographs into the scanner to preserve (as much as possible) the correct perspective and angle such that all images in the database are as aligned as possible. Alternatively, if video photography is used, the images can be captured in "realtime" by using a video camera, an image capture board and other commercially available hardware and software. One advantage of this approach is that the film development and scanning steps are omitted, thus saving time and alleviating some of the alignment and perspective issues. The process used in correcting remaining alignment problems is described under Fine-tuning the alignment below.

H. Stencils

In image processing applications, stencils are spatial write-enable masks; they are instrumental in combining bitmaps in cut and paste operations. In order to derive the stencils, images are preprocessed such that the image subjects (i.e., the garments and the basic model body) are easily separable from their backgrounds There are several reasons why every image in the database has a unique stencil. As discussed above, a key feature of my system is that it allows you to mix and match garments. In other words, my system creates ensembles by layering images on top of each other. In essence this is a cut and paste operation facilitated by the use of stencils. Another reason that stencils are important is that they are instrumental aligning each image to all other images in the database, as will be shown in the Fine-tuning the alignment section below.

Figure 1B:
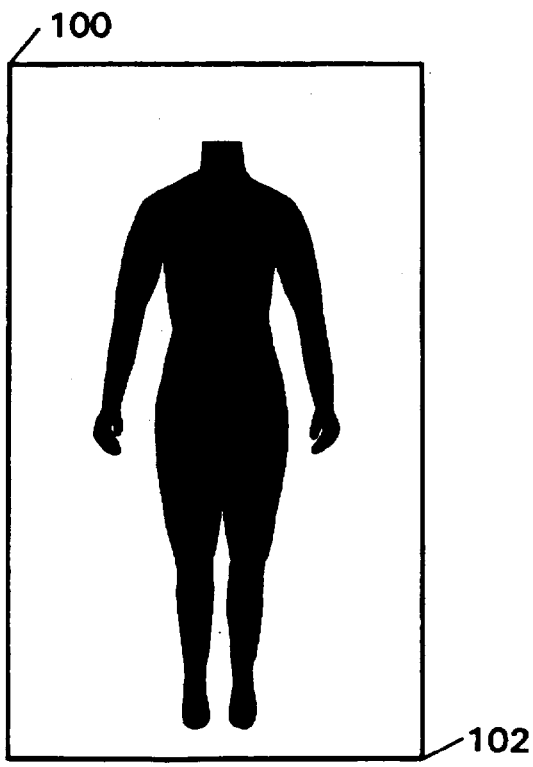
FIG. 1B depicts a "headless" stencil of the basic model body.
Figure 1C:
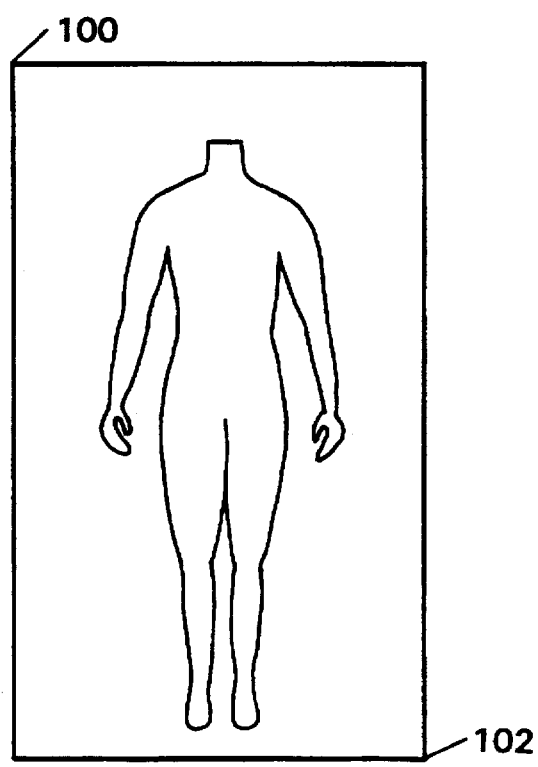
FIG. 1C depicts a headless basic model body as it will be included in the system.
Figure 2A:
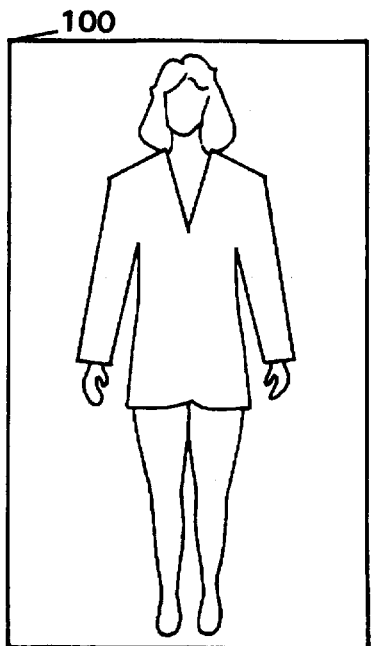
FIG. 2A depicts a garment image (a jacket) as captured during a photography session.
Figure 2B:
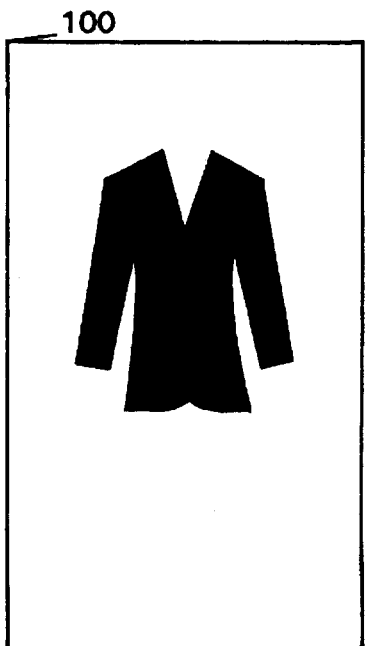
FIG. 2B shows the stencil of the jacket (FIG. 2A).
Figure 2C:
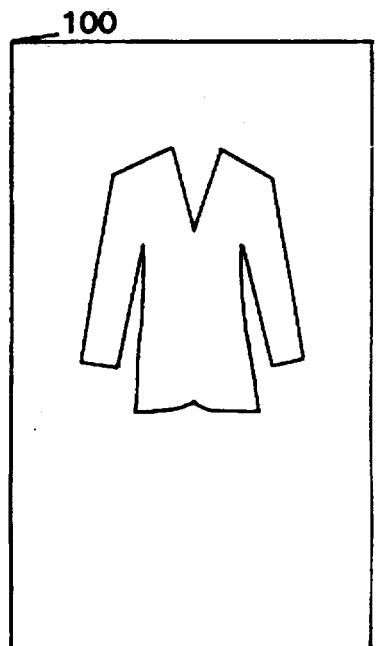
FIG. 2C shows the jacket as separated from its background.
Figure 3A:
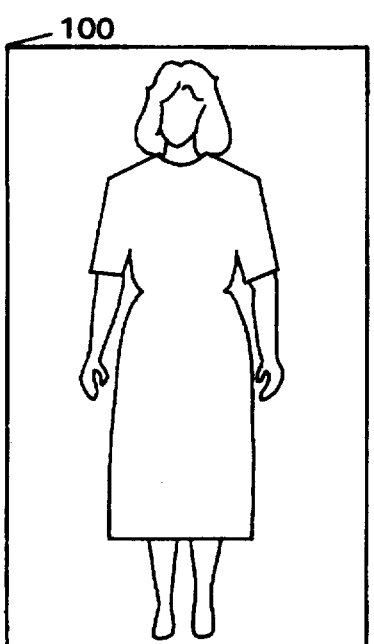
FIG. 3A depicts a garment image (a dress) as captured during a photography session.
Figure 3B:
FIG. 3B shows the stencil of the dress (FIG. 3A).
Figure 3C:
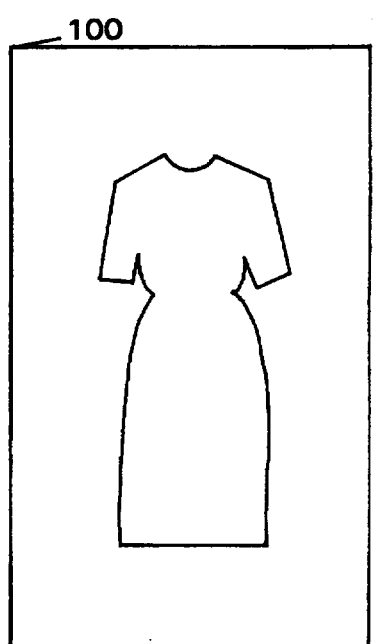
FIG. 3C shows the dress as separated from its background.

In the prototype system that I have developed for this specification, the stencils of garment images are prepared such that any exposed flesh of the model used in a garment-capturing photography session is removed from the garment image; in essence exposed flesh is treated as background. The reason that exposed flesh is considered background is that the garment image itself will later be layered over the basic model body image, and any flesh which is ultimately exposed will be that of the basic model body. FIG. 1A shows the basic model as captured during a photography session, FIG. 1B depicts a "headless" stencil of the basic model body, and FIG. 1C depicts a headless basic model body as it will be included in the system. FIGS. 2A through 3C depict two examples of garment images as captured during photography sessions (FIGS. 2A and 3A), the stencils of these garment images (FIGS. 2B and 3B), and finally the garment images as separated from their backgrounds (FIGS. 2C and 3C).

I. Centering the Basic Model Body

When source images in this prototype system are geometrically transformed, i.e., warped, the magnitude of warping (i.e., reshaping) is applied equally to the left and right sides of the image undergoing the geometric transformation. If, for example, a client's bust is 4% larger than the basic model body's bust, my system would warp the left and right sides of the model's bust area by 2% each in rendering the client's bust. If the model's pose in the garment-capturing photography session is symmetrical—see The raw images section above—this type of warping would retain the balanced appearance.

Figure 4A:
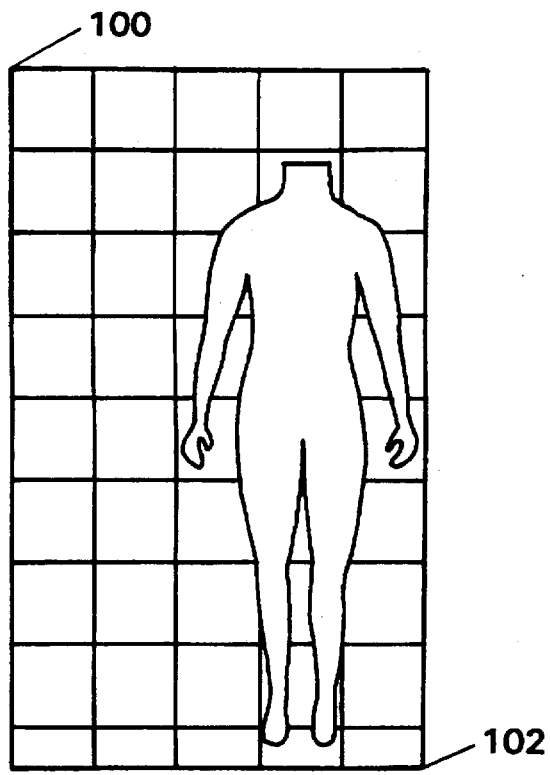
FIG. 4A shows an example of an uncentered basic model body (a grid is imposed).
Figure 4B:
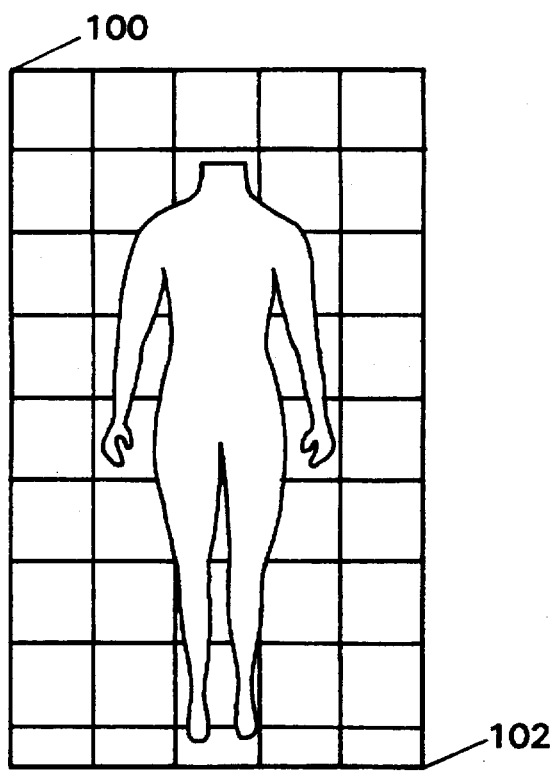
FIG. 4B shows an example of a centered basic model body (a grid is imposed).

In order for this balanced warping to work correctly, the basic model body is horizontally centered in its bitmap. (Recall that garment images will be aligned to and layered over the basic model body; if the basic model body is centered in its bitmap, all garment images will also be centered in their respective bitmaps, thereby guaranteeing balanced warping.) An effective way to do this is to impose a grid on the basic model body bitmap and to reposition, i.e., horizontally center, the basic model body, using the grid as a template. FIG. 4A gives an example of an uncentered basic model body; FIG. 4B gives an example of a centered basic model body.

J. Fine-tuning the Alignment

Sometimes, as in the case of photography sessions where live models are used in garment-capturing photography sessions, various garment images might be captured at different angles because of slight variations in the model's posture from snapshot to snapshot. At other times faulty alignments are due to errors in the process of digitizing images—as when different images are fed into a flatbed scanner at slightly varying angles. These misalignments are corrected before the garment images are included in the database. As has been already stressed, each image in the database is aligned to all other images in the database so that 1) each garment layer lies naturally over any and all under garment layer(s); and 2) the entire ensemble (i.e., one or more garment layers) lies naturally over the basic model body (it is as if the basic model body represented one layer and the ensemble another). Recall that the basic model body image is simply model body upon which all median size garment images will be layered.

Figure 5A:
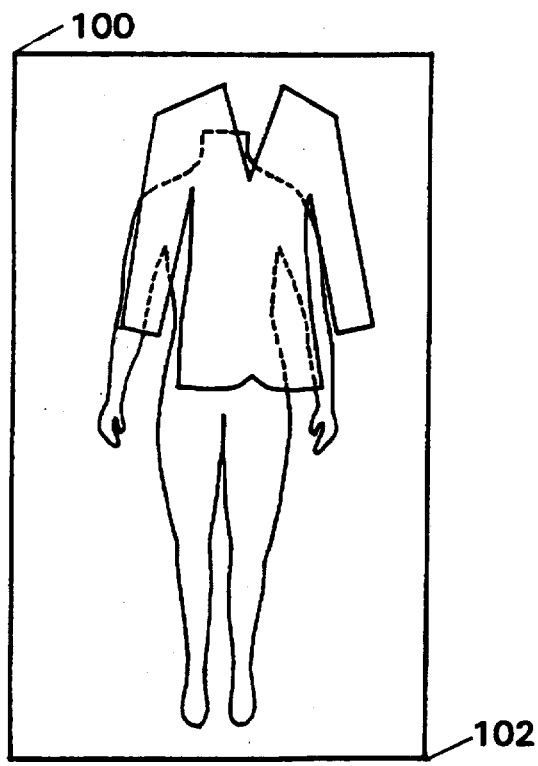
FIGS. 5A through 5C illustrate a simple sequence of fine-tuning the alignment of a garment to the basic model body.
Figure 5B:
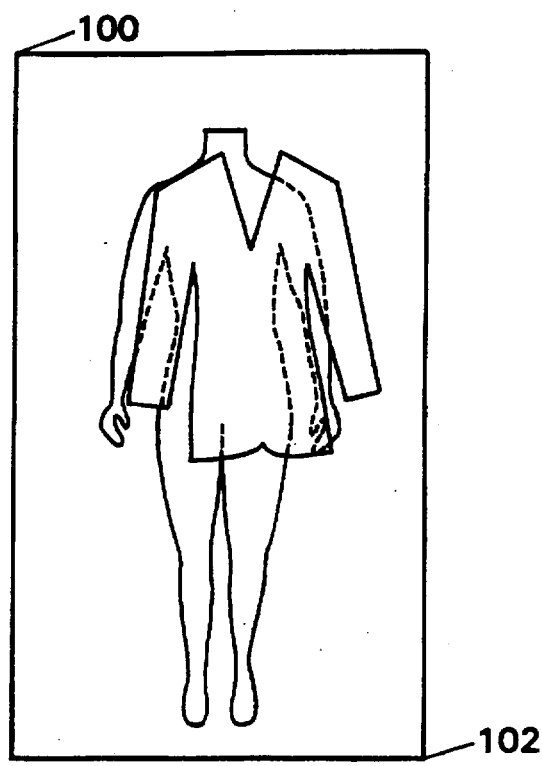
Figure 5C:
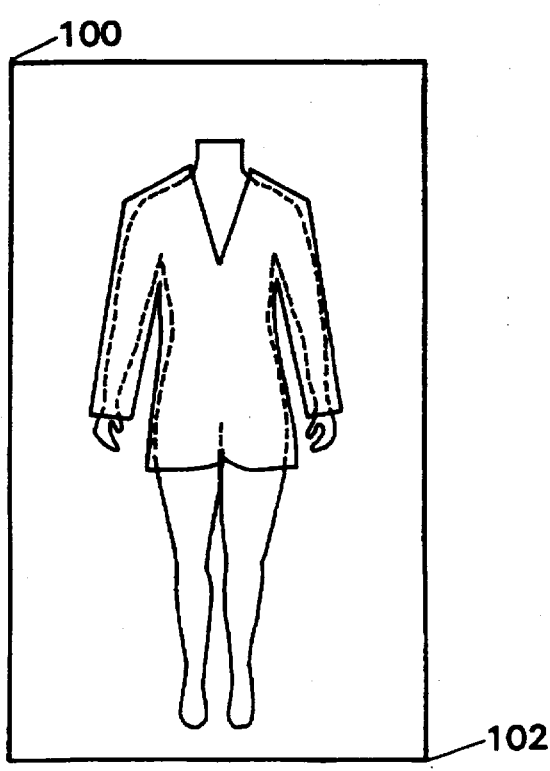

The first step in achieving these alignments is taken by setting up the photography shoot sessions correctly, as discussed in The raw images section above. As images are added to the database, a more fine-tuned alignment can be achieved by visually aligning each added image to the basic model body image, resulting in what I call a composite image. This can be done by positioning and repositioning a particular garment image through its stencil and onto the basic model body image, until a satisfactory visual alignment is achieved. FIGS. 5A through 5C illustrate a simple sequence of fine-tuning the alignment of a garment to the basic model body.

Figure 5D:
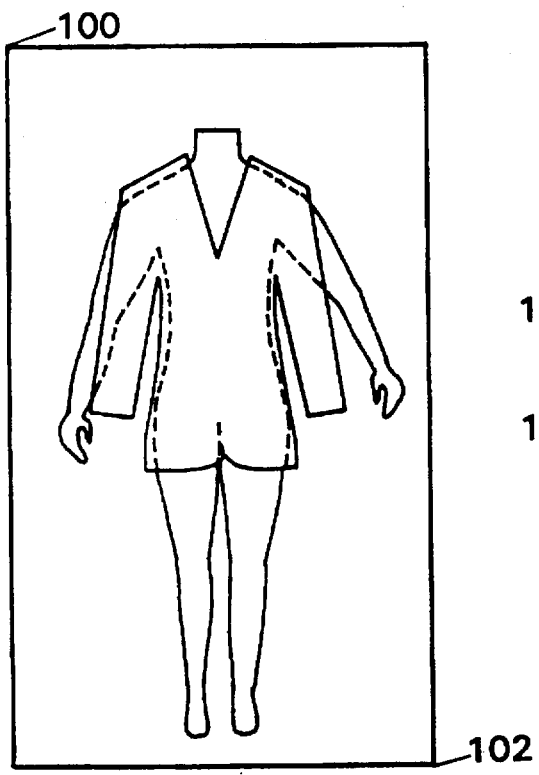
FIGS. 5D through 5F illustrate a case of a composite image where the basic model body's arms are trimmed and translated so that the sleeves cover flesh of the arms neatly.
Figure 5E:
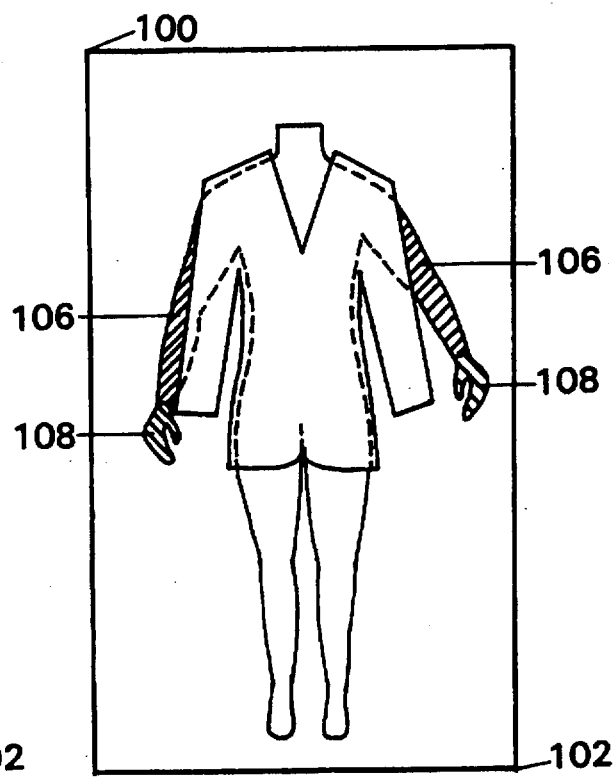
Figure 5F:
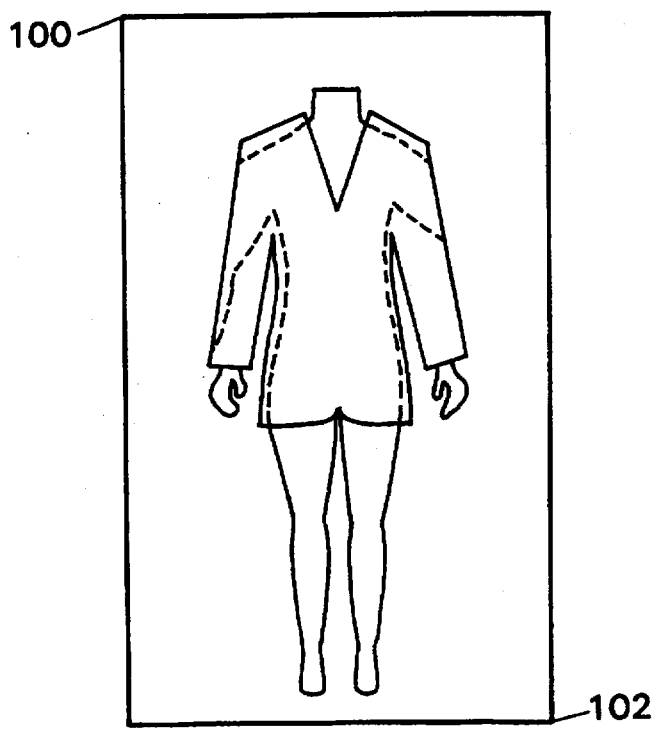

Another issue which is addressed at this time is to trim, translate, and/or rotate any areas of the basic model body's arms which do not lie squarely under the garment's sleeves; this can be done easily with a pointing device such as a mouse. Please note that it is not the basic model body as such that is being adjusted here, but rather the composite image of the garment as layered over the basic model body; unnaturally protruding "fleshy" areas of the sleeves of the garment are corrected on this composite image. FIGS. 5D through 5F illustrate a case of a composite image where the basic model body's arms are trimmed 106 and translated/rotated 108 so that the sleeves cover flesh of the arms neatly. Contrast this with FIGS. 5A through 5C (discussed above) where the issue is simply one of misalignment.

To summarize, two potential problems have been addressed in this section: 1) correcting misalignments and 2) adjusting (e.g., trimming, translating, and rotating) the arms. The aligned and/or adjusted composite image is now temporarily saved for further pre-processing; this is explained in greater detail in the Detaching the arms section below.

K. Off-centered Legs

It should be noted that different visual criteria might be used when fine-tuning the alignment depending on the type of garment being aligned to the basic model body image. Dresses and tops will most certainly be first visually aligned to shoulders, neck and arms of the basic model body, and afterward to its legs. It is still possible, however, that the legs will extend off-center from under the ensemble. As discussed above, this problem is often due to errors in digitizing the original photographs, as when different photographs are fed into the scanning apparatus at slightly different angles, or when live models are used and their postures vary from snapshot to snapshot. This problem of off-centered legs is corrected at run-time as discussed in Other processing issues.

L. Detaching the Arms

As I have already pointed out, my system first establishes a relationship between an ensemble and a client's body shape and then renders an image which reflects that client's specific shape. It is useful to detach the arms/sleeves from the torso of the composite image—i.e., the garment image as layered over the basic model body image in the Fine-tuning the alignment section above—to prevent distorting their shape when the torso of the basic model body, clad in the median size garment(s), is reshaped to conform with a client's body measurements. The approach that I use to detach the arms/sleeves is to direct a pointing device like a mouse to some point above the shoulder of the composite image—as processed in Fine-tuning the alignment above—and to draw a vector that will pass cleanly through the arm of the composite image as close as possible to the armpit, leaving as much of the torso intact as possible. This vector originates at some point on the background of the composite image, intersects the garment (i.e., the non-background area), and once it leaves the garment and re-enters the background, the vector should be terminated and not re-intersect the garment. This vector is called the detachment vector. Once this detachment vector has been determined, any additional other vectors are drawn to isolate the arm completely from the torso.

The problem of detachment and reattachment can be kept simple by fully detaching and re-attaching arms/sleeves with single detachment vectors (FIG. 7A and FIG. 8A); more complex images may require using both detachment and other vectors. I provide two preprocessing examples (FIGS. 6A and 6B) of how one might detach arms/sleeves using detachment vectors 110 and 112 and other vectors 114.

Figure 6A:
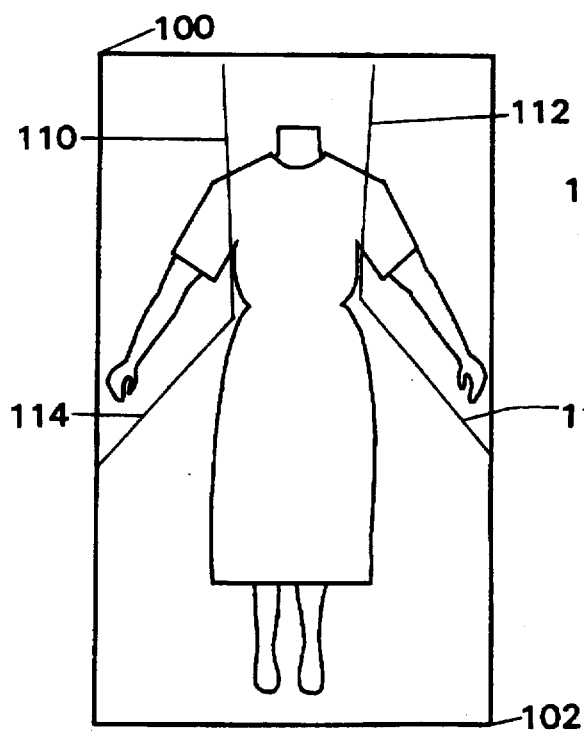
FIGS. 6A and 6B show how one might detach arms/sleeves using detachment vectors and other vectors.
Figure 6B:
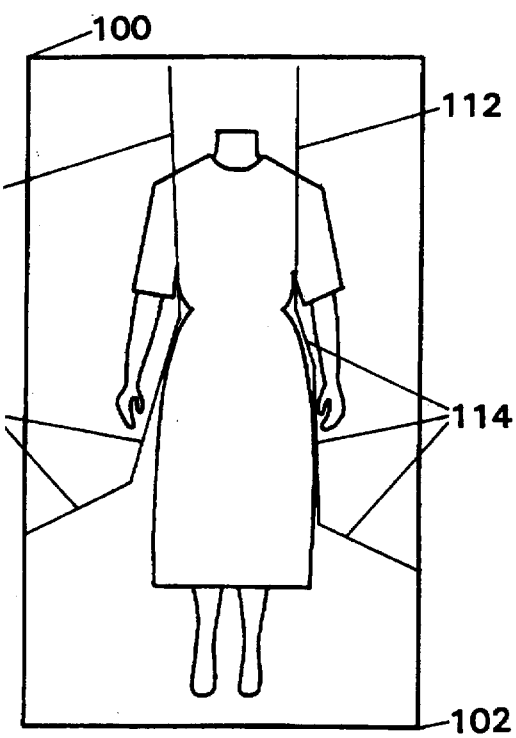

Sometimes it is easier to establish detachment vectors if the basic model body is positioned such that her arms are held at some distance from her torso. While I do not believe that this type of pose is crucial to a correct implementation of my system, I believe that it does make implementation easier, since arms/sleeves which are somewhat extended from the torso are more easily detached and re-attached. FIG. 6A shows the arms/sleeves being detached (detachment vectors 110 and 112 and other vectors 114) in a composite image having a pose with the arms slightly extended; FIG. 6B depicts the arms/sleeves being detached 110, 112, and 114 in a pose with the arms hanging straight.

Figure 7A:
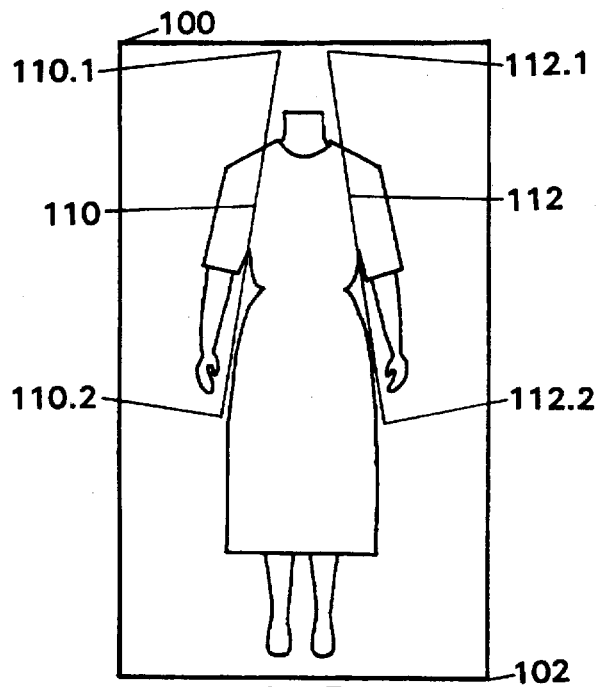
FIGS. 7A, 7B, 8A, and 8B which are composite images, illustrate detaching the arms/sleeves of the basic model body as clad in a dress (FIGS. 7A and 7B) and as clad in a jacket (FIG. 8A and 8B)
Figure 8A:
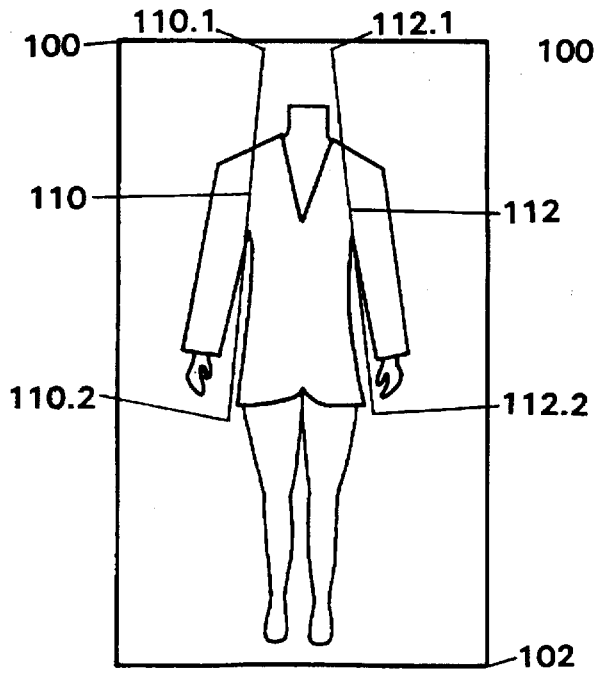

The above procedure of detaching the arms/sleeves is applied to both the left and right arms of all composite garment images that have sleeves—shirts and pants, for example, do not have sleeves—in the database; also, the coordinates of the end points of the left and right detachment vectors are saved since they will be used to re-attach the arms/sleeves after the "armless" ensemble has been reshaped. FIGS. 7A and 8A illustrate detaching the arms/sleeves of the basic model body as clad in a dress (FIG. 7A, detachment vectors 110 and 112, end points of detachment vectors 110.1, 110.2, 112.1, and 112.2) and as clad in a jacket (FIG. 8A). See also the entries for the coordinates of the end points of the detachment vectors in Table B.

M. The Preprocessed Garment Images

Figure 7B:
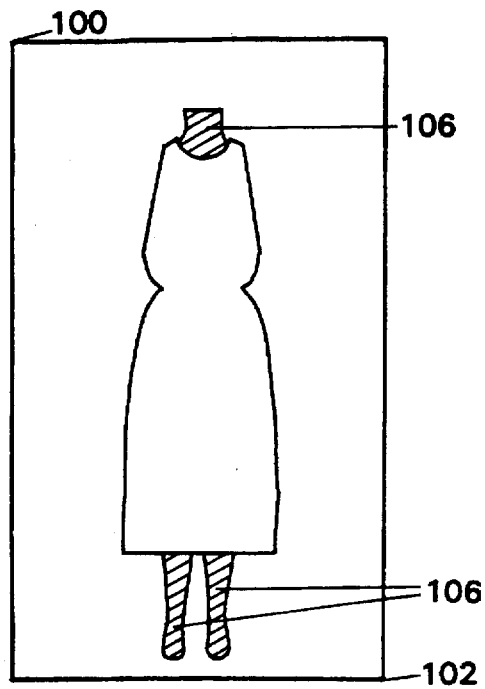
Figure 8B:
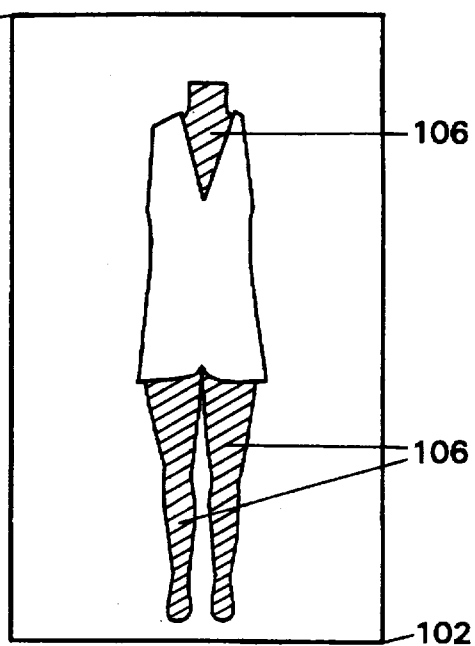

After any trimming and alignment problems have been corrected and the detachment vectors have been established, all remaining flesh is removed (trimmed 106) from the torso of a composite image (FIGS. 7B and 8B); stencil operations can be used here. FIGS. 9A through 10C show the above dress (FIG. 9A) and jacket (FIG. 10A)—both are now armless, with all extraneous flesh removed—and their respective "fleshful" arm/sleeve entities as they are included in the database; uppercutlines 116 and lowercutlines 118 are also indicated. Please note that any flesh that is part of an arm/sleeve entity, as delineated by a detachment vector, remains as part of the arm/sleeve entity (FIGS. 9B, 9C, 10B, and 10C) and is later processed separately. The garment images, now composed of "fleshful" arms/sleeves (FIGS. 9B, 9C, 10B, and 10C) and "fleshless" torsos (FIGS. 9A and 10A) are fully preprocessed. Please note that it is not necessary to store and save "armless" images in the database; as long as the detachment vector data is saved (see Table B), the actual images can be saved "armful".

N. Garment Classification

For the purpose of this discussion, please assume that garments might be classified as either fitted or shift. An example of a fitted garment would be a dress which has little or no ease—i.e., slack—in its bust, waist, and hips. In the median size, this dress would hug the basic model body closely, and the garment's shape would be influenced by the contours of the underlying body. Moreover, this type of fitted garment would tend to take on the shape of disproportionate client bodies, and become more and more warped—lose its hourglass silhouette—as the underlying client body deviated from the shape of the basic model body. (Please note that in Table A, any given row in the chart would constitute a body of approximate hourglass proportions; a body comprised of measurements from different rows would be more or less disproportionate). Examples of fitted garments include bathing suits, certain tailored suits, certain knitted clothes, and any garments where the overall silhouette of the underlying body is emphasized.

Figure 36A:
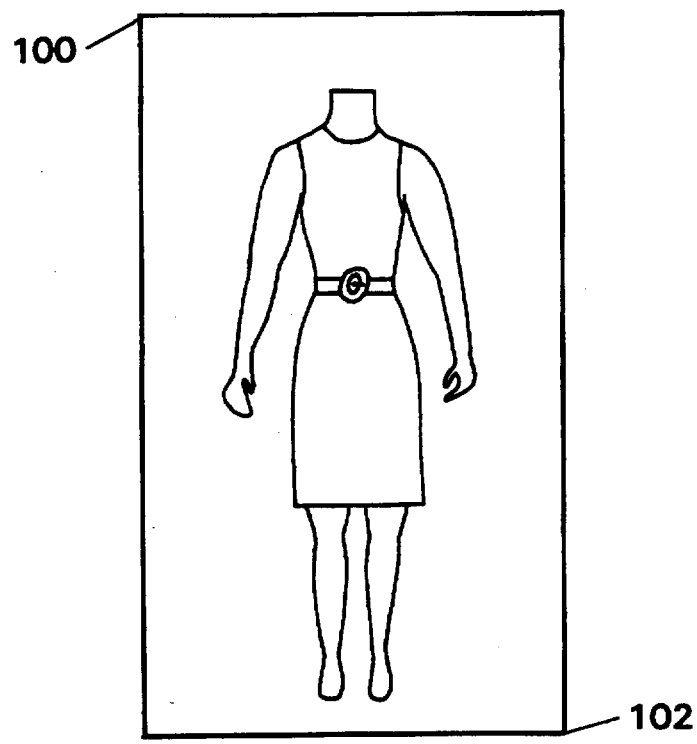
FIG. 36A shows the basic model body in a tight fitting dress.
Figure 36B:
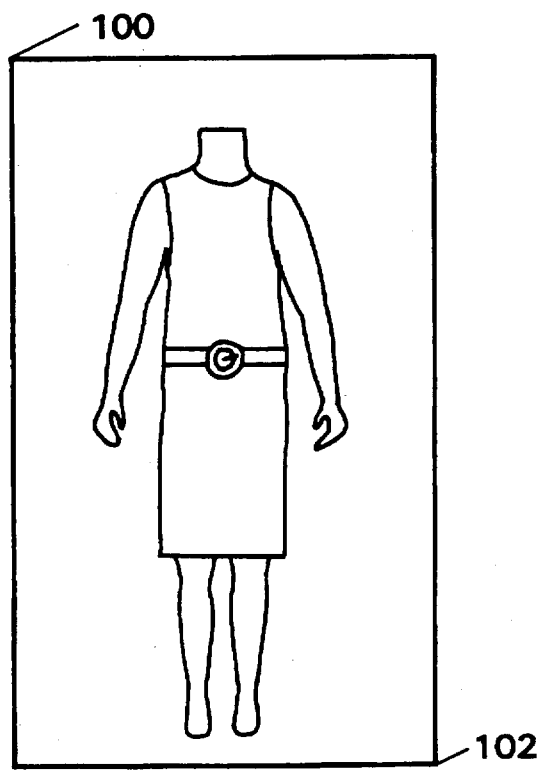
FIG. 36B shows a body with an average bust, a large waist, and average hips in a tight fitting dress.

A garment would be classified as shift if its waist had substantially greater ease than its bust and hips. This type of garment would tend to hold its own shape regardless of the waist size, while the bust and hips would have a greater influence on its shape. Thus, for example, a person with measurements 92/69/97 cm—the basic model body—would tend to look very similar to one with measurements 92 (bust variance 12)/81 (waist variance 24)/97 (hip variance 12) cm in this type of garment. FIG. 36A shows the basic model body in a tight fitting dress; FIG. 36B shows a body with an average bust, a large waist, and average hips in the same style dress; note that in FIG. 36C both bodies (from FIGS. 36A and 36B) would appear very much alike, despite their different waist measurements, if a loose "shift" jacket were put over the dress. Thus, loose shift garments tend on the one hand to disguise body disproportions, and on the other hand to de-emphasize classic hourglass shapes. Examples of loose shift garments include shift dresses, certain tunics, chemises, oversized sweaters, loose jackets, etc.

For practical purposes, garments might have greater or lesser amounts of ease in the bust, and/or waist, and/or hips, depending on the objectives of the designer. Certain A-line dresses, for example, have little or no ease in the bust and waist areas, with ample ease in the hip area; adopting my terminology, one might call this type of garment "non-fitted/non-shift". I have described garments as shift or fitted in the manner above merely to make this prototype straightforward and lucid. In a production system, garments in the database would be analyzed and categorized as to their precise relative girth ( e.g., bust, waist and hip) eases. Please note that Table B has an entry for garment classification.

Figure 11A:
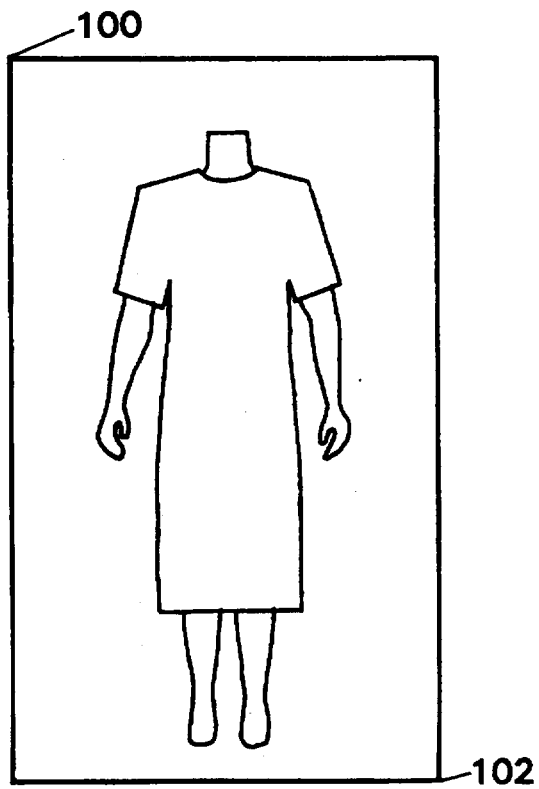
FIG. 11A illustrates a shift dress on the basic model body.
Figure 11B:
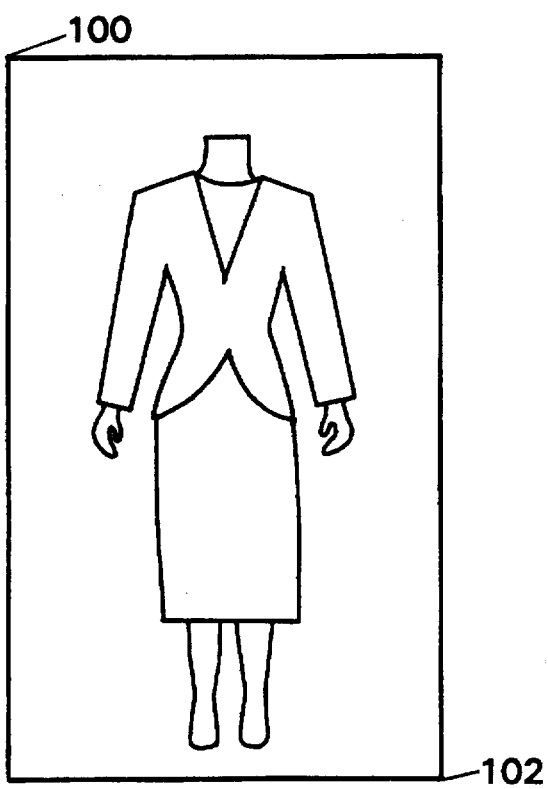
FIG. 11B depicts the same shift dress (from FIG. 11A), but with a fitted jacket, so that the underlying dress takes on a new shape and the ensemble assumes the "fitted" classification of the jacket.
Figure 11C:
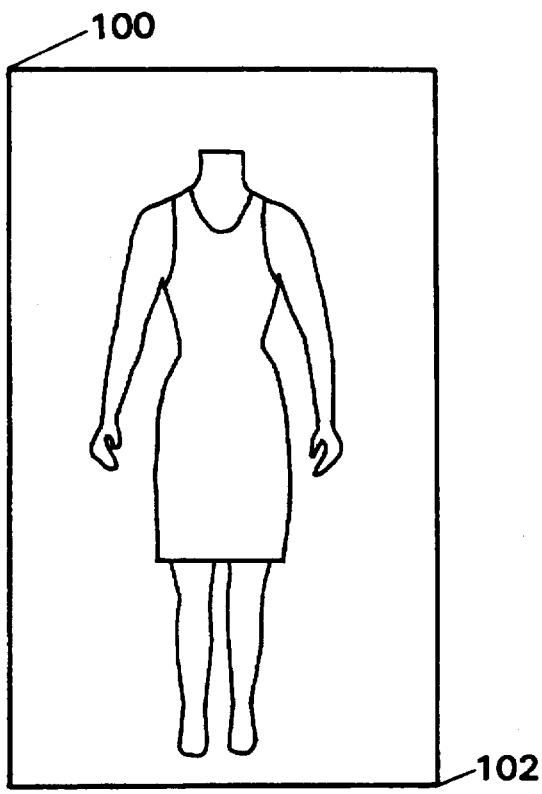
FIG. 11C illustrates a fitted dress on the basic model body.
Figure 11D:
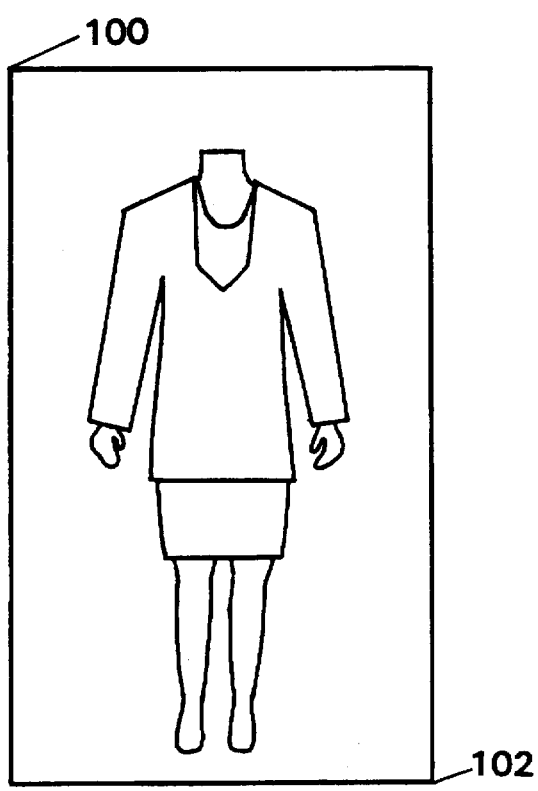
FIG. 11D depicts the same fitted dress (from FIG. 11C), but with a "shift" top, so that the ensemble assumes a "shift" classification.

A special situation arises when ensembles have more than one layer. If, for instance, an ensemble were comprised of a loose shift dress and a tight, fitted top, the ensemble would be classified as fitted since the uppermost layer overtakes the shape of the lower layer, thus determining the ensemble's classification. FIG. 11A illustrates a shift dress; FIG. 11B depicts the same shift dress, but with a fitted jacket, so that the ensemble takes on a fitted classification. Contrast this with a scenario where a fitted dress (FIG. 11C) is covered by a loose, "shift" top (FIG. 11D); this latter combination ensemble would be classified as shift.

O. Other Processing Issues

As with the coordinates of the end points of the left and right detachment vectors and garment classifications, certain other important information is collected with respect to each garment image. At this point I will briefly describe what additional data are needed, the methods for acquiring these data, and why these data are important.

Figure 12:
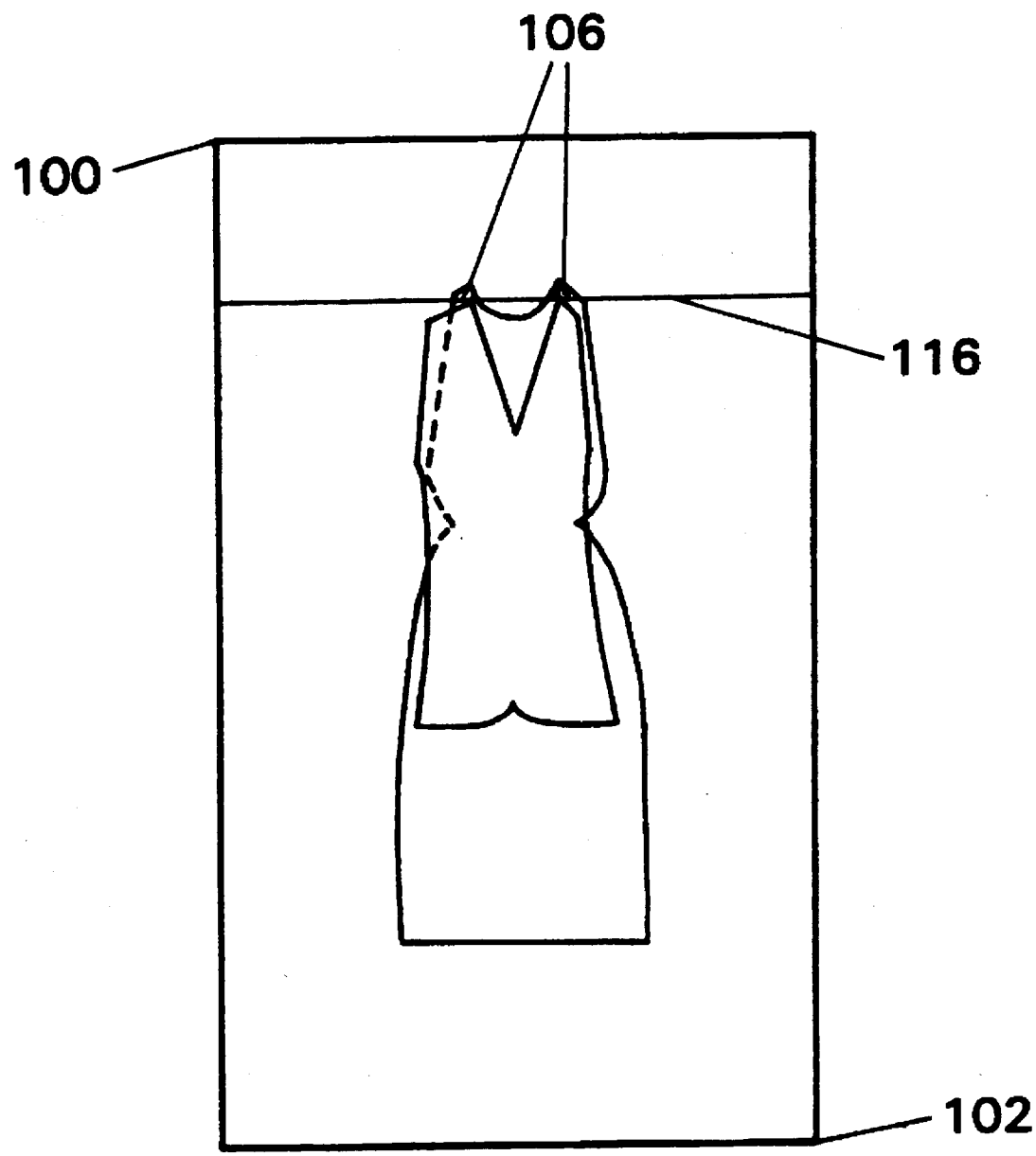
FIG. 12 illustrates trimming of the first garment layer above the uppercutline of the second garment layer.
Figure 13:
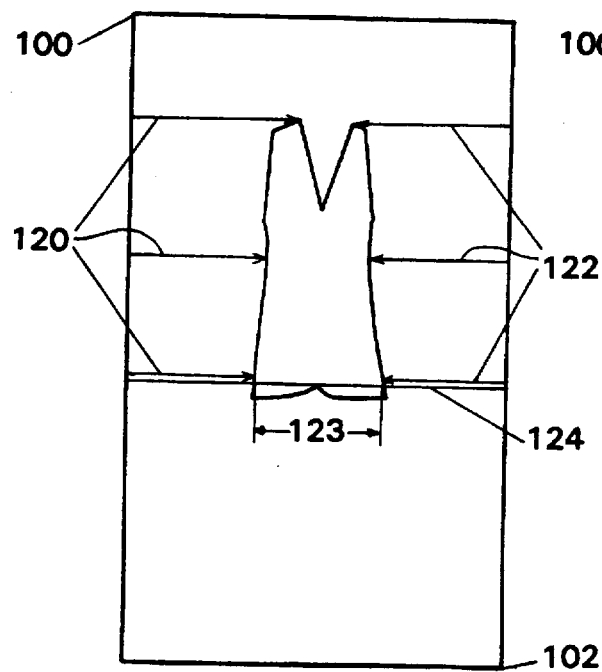
FIG. 13 illustrates how the second garment layer is scanned left to right and right to left to determine X coordinates for leftmost and rightmost non-zero pixel value on each Y line. Scanning is done down to the warpline.
Figure 14:
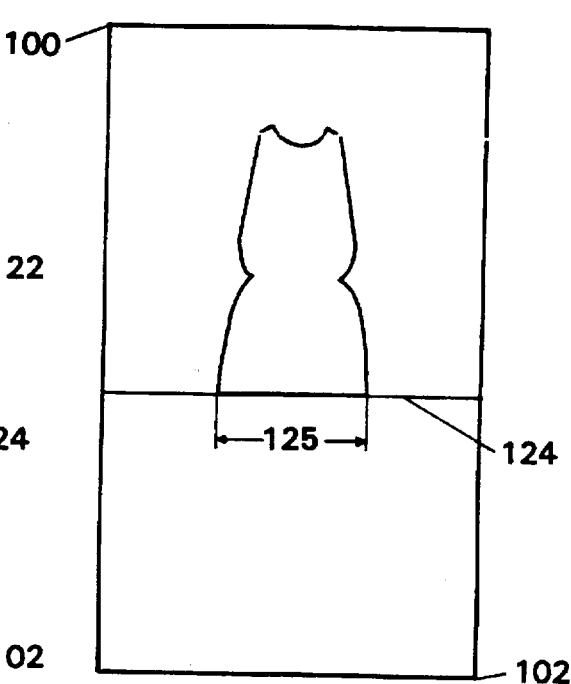
FIG. 14 shows a region (untrimmed) of the first garment layer down to the warpline.
Figure 15:
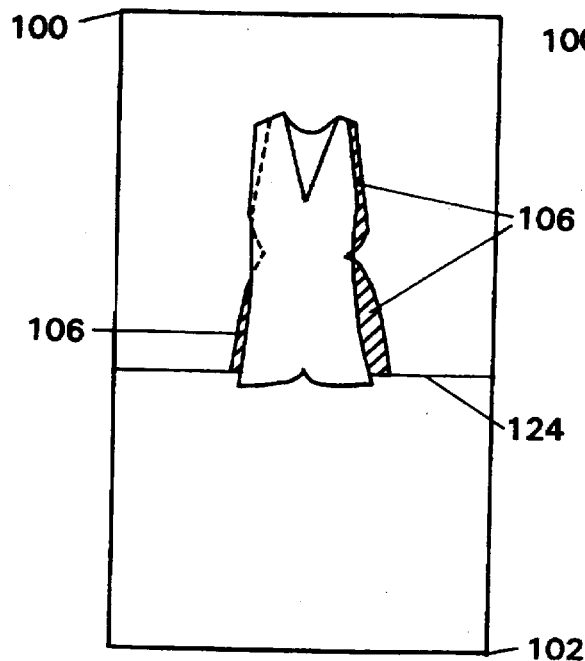
FIG. 15 illustrates how the first garment layer is trimmed down to the warpline to reshape it so that will fit exactly under the second garment layer.
Figure 16:
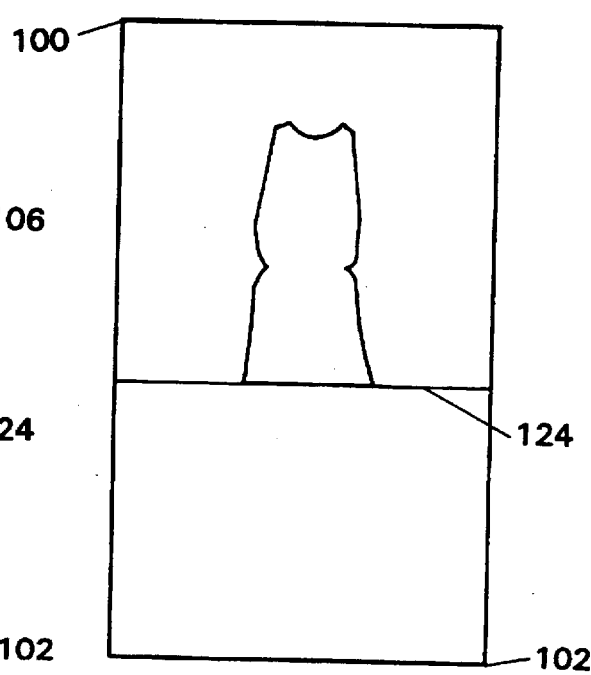
FIG. 16 illustrates the trimmed first garment layer (down to the warpline).
Figure 17:
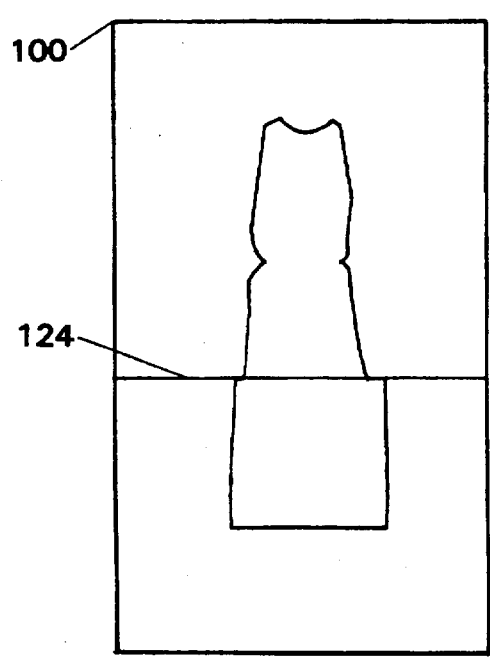
FIG. 17 shows a region of the first garment layer as in FIG. 16; the region below the warpline is shown attached (but uncentered).
Figure 18:
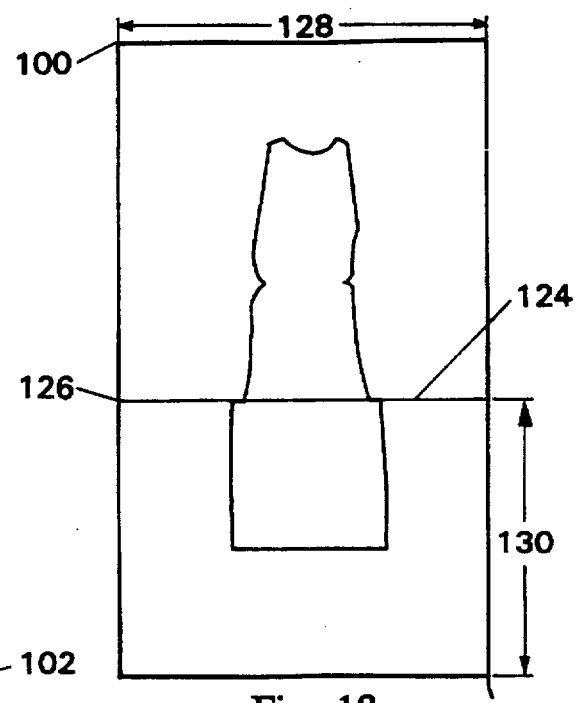
FIG. 18 shows the first garment layer as in FIG. 16 (up to the warpline); the region lying below the warpline is shown centered to the trimmed region above the warpline. The source rectangle for warping the bottom region is also shown.
Figure 19:
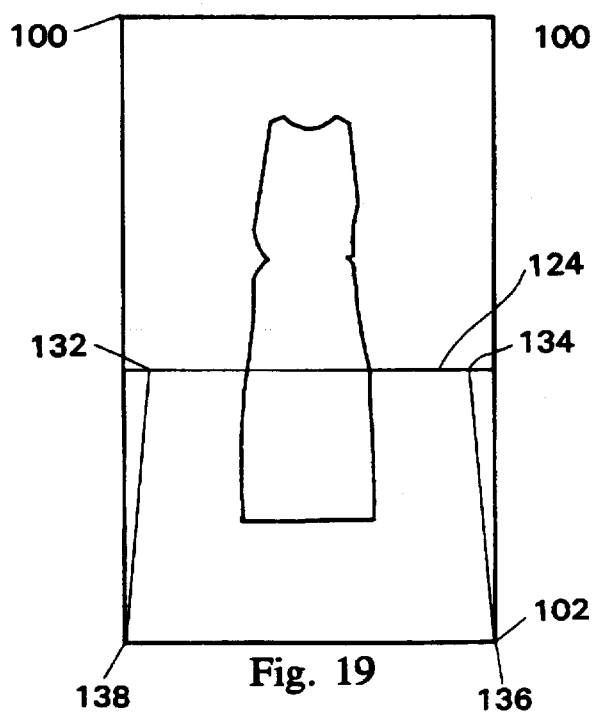
FIG. 19 shows the destination quadrilateral which is used in warping the bottom region of the first layer; the first layer is also shown having the shape of the second layer down to the warpline (as in FIG. 16); below the warpline the first layer is centered (as in FIG. 18) and reshaped (geometrically transformed) so that it will fit exactly and smoothly under the second.

1.) An upper boundary, called uppercutline 116, for each garment layer. This is a line that is drawn parallel to the X axis as close as possible to the top edge of garment layers, cutting off as little as possible. The uppercutline is used in cases where there are two garment layers in an ensemble. The purpose of this line is to trim off any part—above the boundary—of the layer lying under the top layer. FIG. 12 illustrates an actual situation where the uppercutline 116 is used to trim 106 a garment layer lying under another garment layer.

Figure 20:
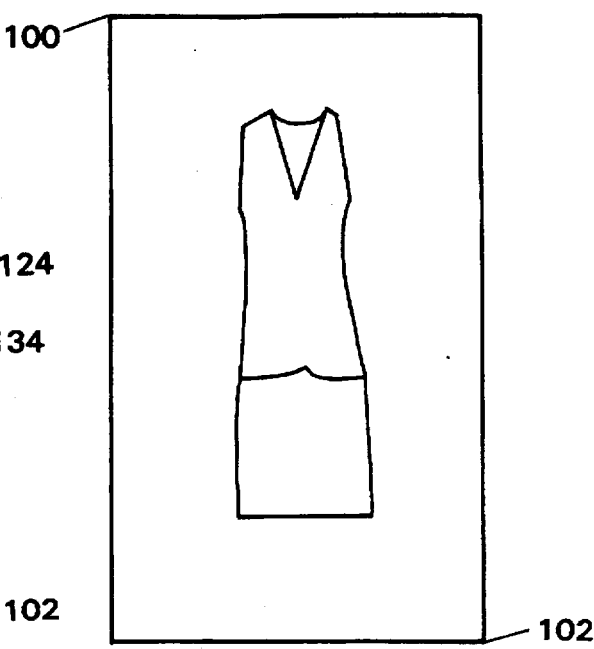
FIG. 20 shows the processed bitmap as in FIG. 19 (the first layer) combined with the second layer (FIG. 10A) using a stencilling operation (see FIG. 21).
Figure 21:
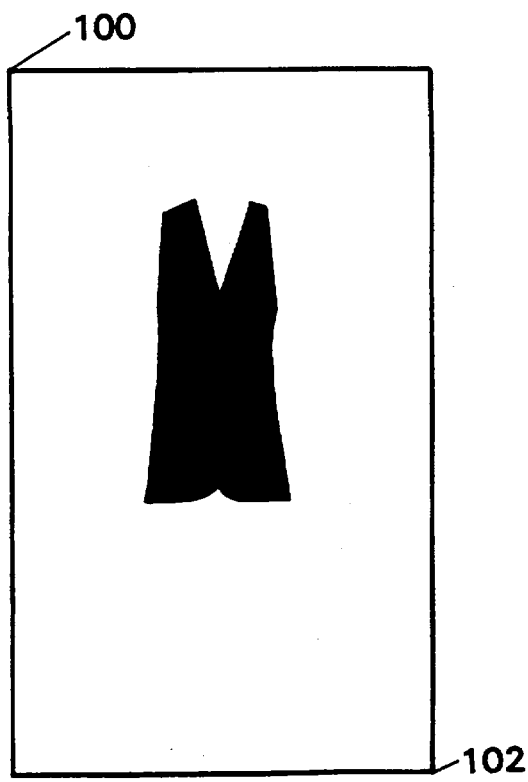
FIG. 21 illustrates the "armless" stencil bitmap for the second layer.
Figure 22:
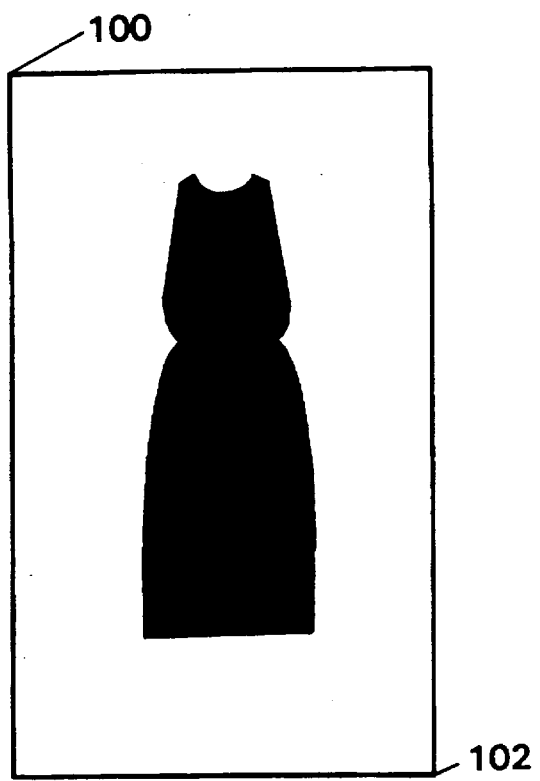
FIG. 22 illustrates the "armless" stencil bitmap for the first layer.
Figure 23:
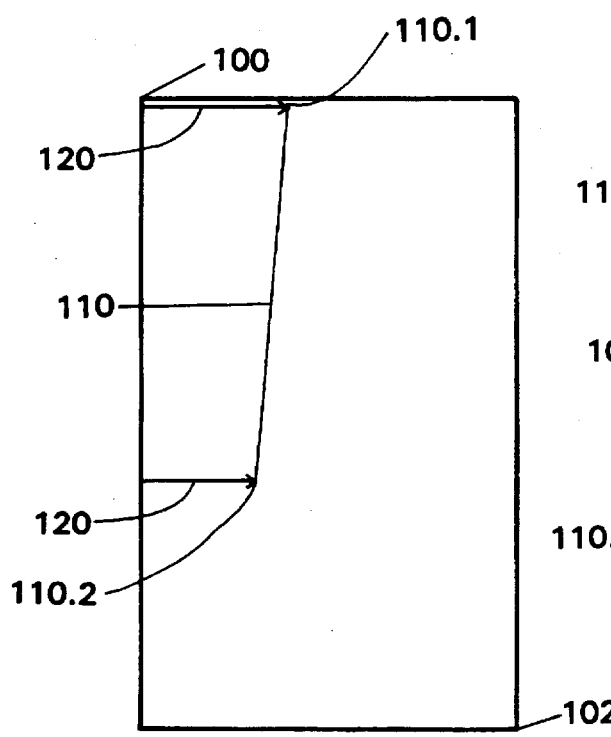
FIG. 23 shows the left vector (determined by identifying the top garment layer) drawn into a "vector" bitmap; the procedure of scanning and determining the X coordinates of the vector is also indicated.

2.) A lower boundary, called lowercutline 118, for each garment layer. This is a line that is drawn parallel to the X axis at some point near or at the lower end of the garment layer. In cases where an ensemble is comprised of one garment layer, the lowercutline is called "dressscan" 155 and is used to correct off-centered legs so that they extend correctly from under an ensemble. In cases where there are two garment layers, both lowercutlines are compared and the greater of the two is used as the "dressscan" and the lesser of the two is called "warpline" 124. This "warpline" is used as a delimiter in making adjustments to the undergarment layer such as trimming, translating and geometrically transforming it so that it lies naturally under the uppermost garment (FIG. 20). FIGS. 13 through 19 illustrate an actual sequence where the warpline 124 is used as in the above discussion; FIGS. 26A though 26E show a situation where the dressscan 155 is used as discussed; these latter FIGS. also use a variation called (dressscan+modelyshift 154).

Table B contains entries for uppercutlines and lowercutlines.

TABLE B

The following table contains the data that would need to be collected if the garments as represented by FIG. 9A through FIG. 10C were going to be included in a database of pre-processed images.

Figure 9A:
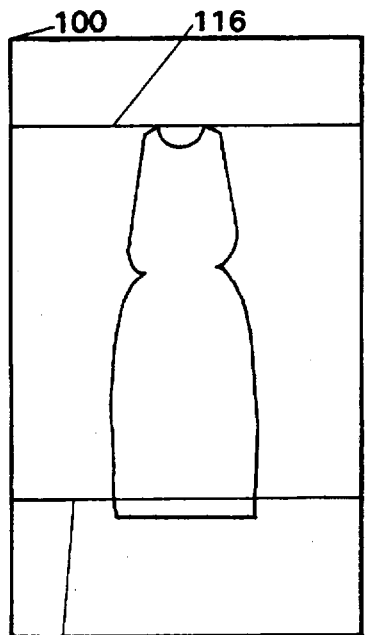
FIGS. 9A-9C through 10A-10C show a dress (FIG. 9A) and a jacket (FIG. 10A)—both are armless, with all extraneous flesh removed—and their respective "fleshful" arm/sleeve entities as they are included in the database. The respective uppercutlines and lowercutlines are also shown. See also Table B.
Figure 9B:
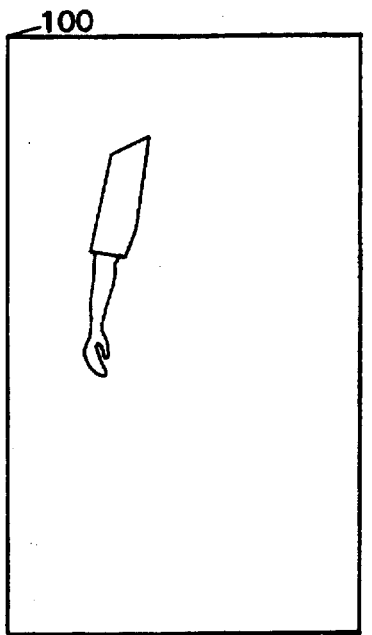
Figure 9C:
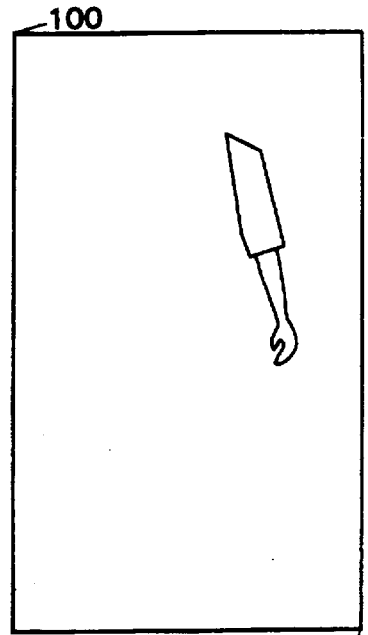
Figure 10A:
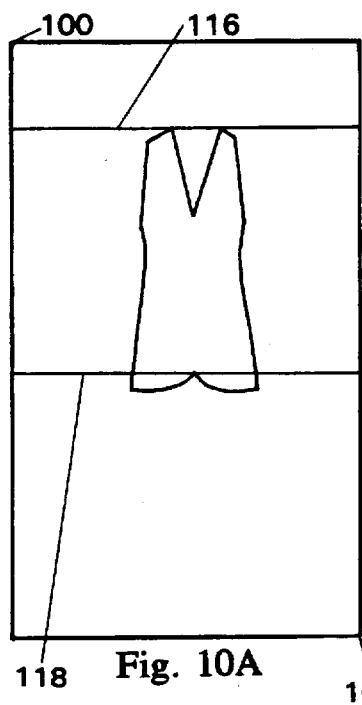
Figure 10B:
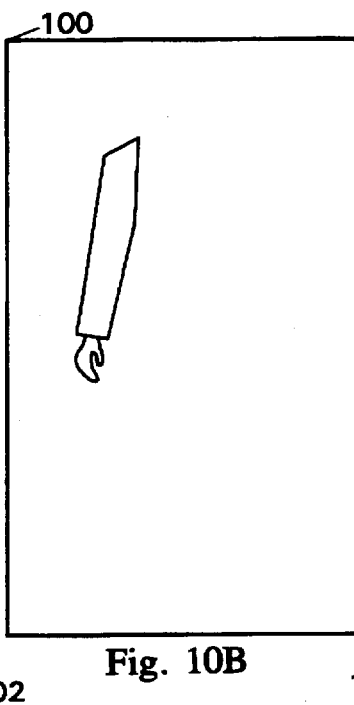
Figure 10C:
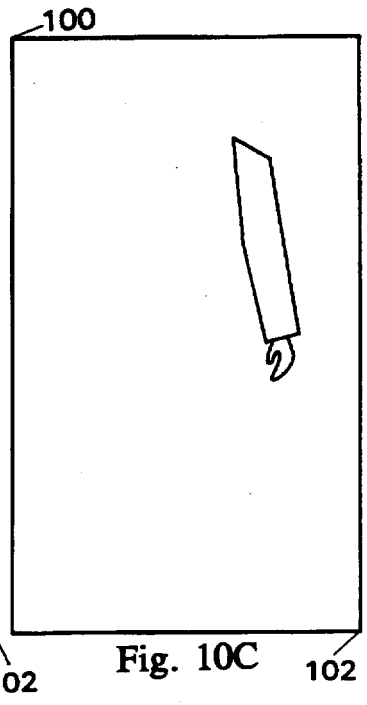

| FIG. 9A.data | |
|---|---|
| uppercutline | 116 |
| lowercutline | 118 |
| upperleftx left detachment vector | 110.1 |
| upperlefty left detachment vector | 110.1 |
| lowerleftx left detachment vector | 110.2 |
| lowerlefty left detachment vector | 110.2 |
| upperrightx right detachment vector | 112.1 |
| upperrighty right detachment vector | 112.1 |
| lowerrightx right detachment vector | 112.2 |
| lowerrighty right detachment vector | 112.2 |
| fitted classification | |
| This is a fitted dress. | |
| FIG. 10A.data | |
| uppercutline | 116 |
| lowercutline | 118 |
| upperleftx left detachment vector | 110.1 |
| upperlefty left detachment vector | 110.1 |
| lowerleftx left detachment vector | 110.2 |
| lowerlefty left detachment vector | 110.2 |
| upperrightx right detachment vector | 112.1 |
| upperrighty right detachment vector | 112.1 |
| lowerrightx right detachment vector | 112.2 |
| lowerrighty right detachment vector | 112.2 |
| fitted classification | |
| This is a fitted top. | |

P. The Online Process

This section will provide a step-by-step description of:

1.) How garments are layered on top of each other neatly and without protuberances and jaggies, the result being an ensemble, 2.) How a 169 cm basic model body is geometrically transformed from the waist down, and then reconstructed into a body reflecting a client's height, 3.) How the ensemble is layered on top of a body having the client's height, but with the basic model body's girth measurements (variance 12 in Table A): bust 92 cm, midriff 73 cm, waist 69 cm, abdomen 86 cm, and hips 97 cm, 4.) How the armless torso of the client body, clad in the ensemble, is geometrically transformed to reflect the client's specific girth measurements, and 5.) How the arms/sleeves are neatly reattached to the reshaped armless clad torso.

Figure 39B:
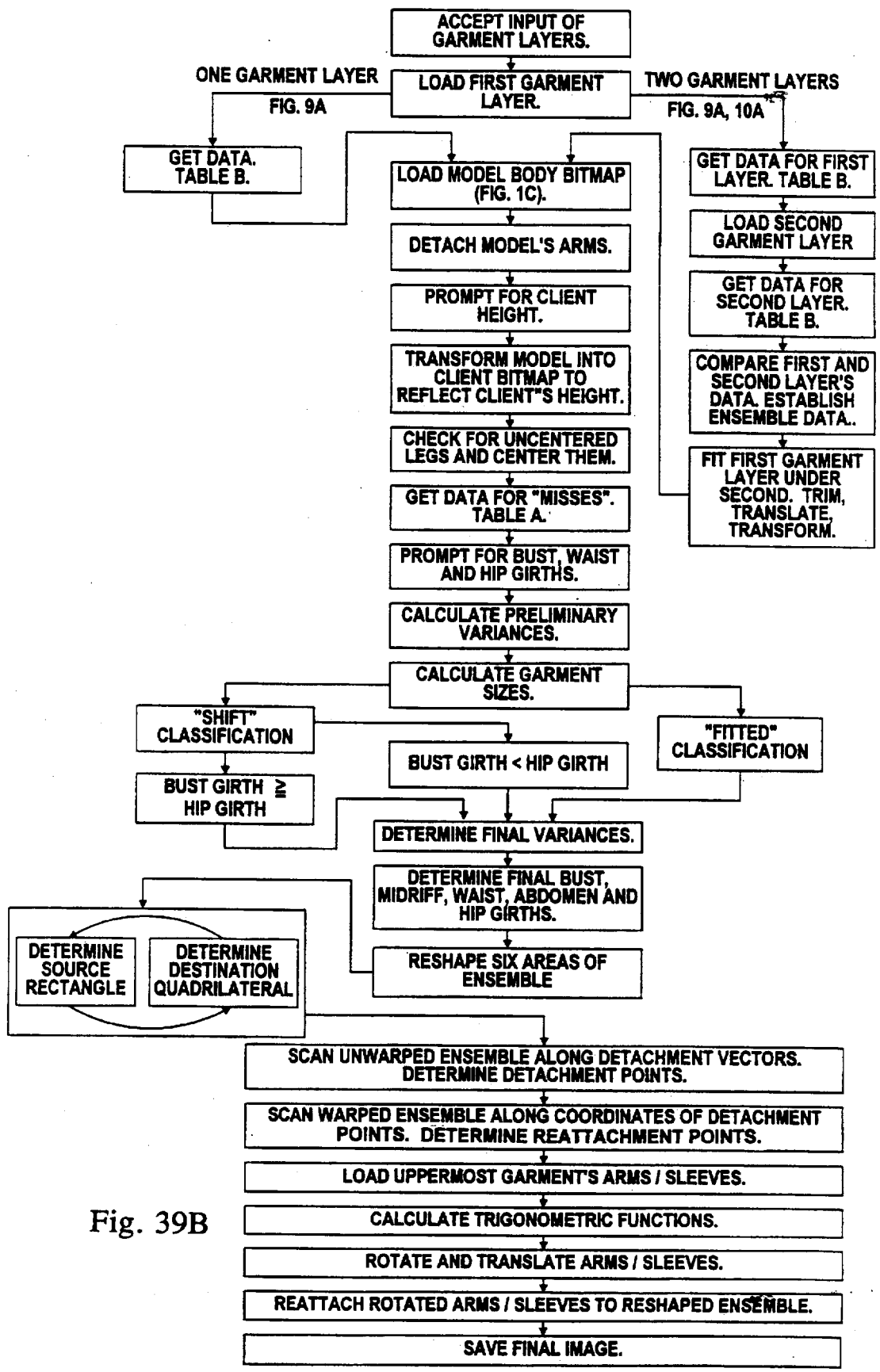
FIG. 39B is a flow chart which outlines the processes which are described in THE ONLINE PROCESS.

In the interest of providing a complete and thorough description of my system, I have decided that supplying a flow chart (see FIG. 39B) is more useful than relying solely on verbal descriptions.

The prototype program was written in the C programming language under the Sun Microsystems operating system, SunOS 4.0.2. The program uses the following functions: LAYER, SHAPE, ATTACH and WARP.

Figure 24:
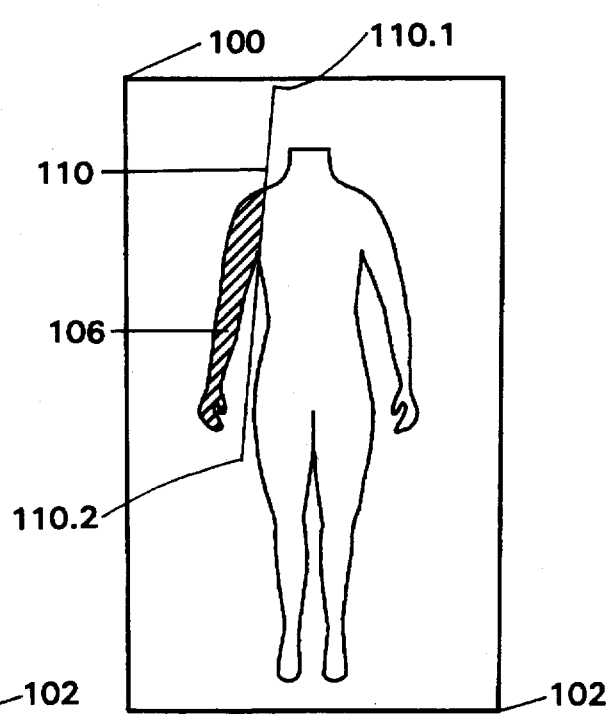
FIG. 24 illustrates the basic model body bitmap with its left side trimmed up the edge of the left vector.

LAYER is the main C function which takes up to two arguments; these arguments identify the database garments which will comprise the ensemble in a program run, for instance the bitmaps represented by FIG. 9A through FIG. 10C. Some of the processes that LAYER performs include the following: the first garment layer is trimmed so that it fits neatly under the second layer, if there are two garment layers (FIG. 13 through FIG. 17); a portion of the first layer is geometrically transformed (via WARP) so that it flows naturally from under the second layer (FIG. 18 and FIG. 19); the arms/sleeves of the basic model body are detached (FIG. 24); the basic model body is geometrically transformed (via WARP) to create a client body of a specific height (FIG. 25A through FIG. 25C); the legs of the basic model body are translated (centered) so that they extend correctly from under the ensemble (FIG. 26A through FIG. 26D); and the ensemble is layered over a body having the girth measurements of the basic model body and the height of a client (FIG. 26E).

Figure 27A:
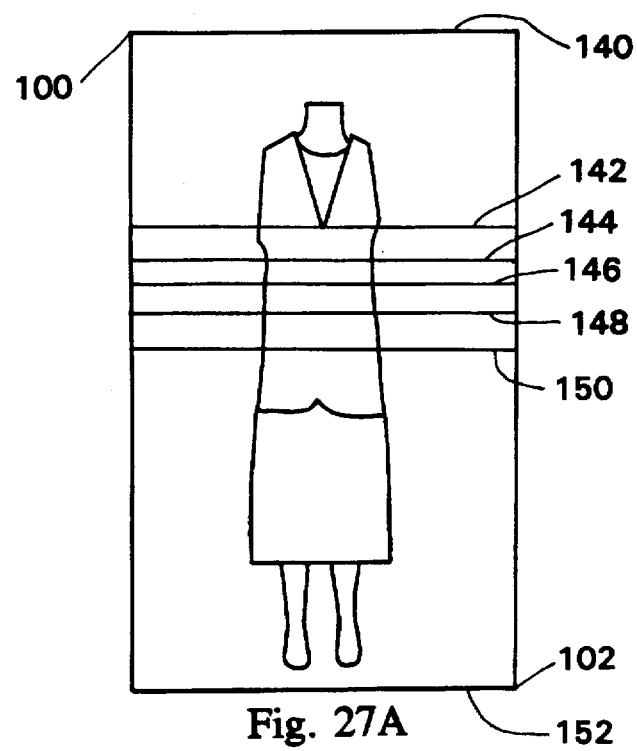
FIG. 27A shows six source rectangles of the "armless" ensemble.
Figure 27B:
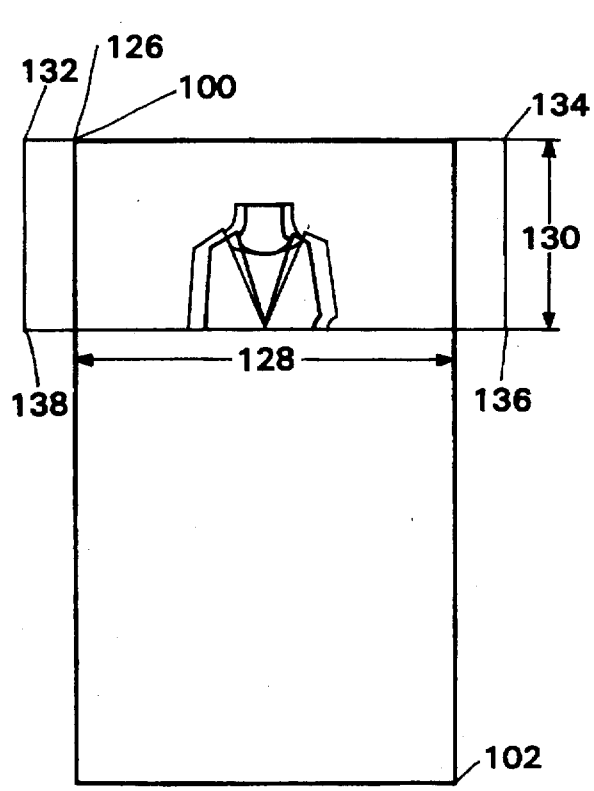
FIG. 27B shows the first source rectangle and the first destination quadrilateral of the "armless" ensemble. Thick lines relate to the unwarped source; thin lines relate to the warped destination.
Figure 27C:
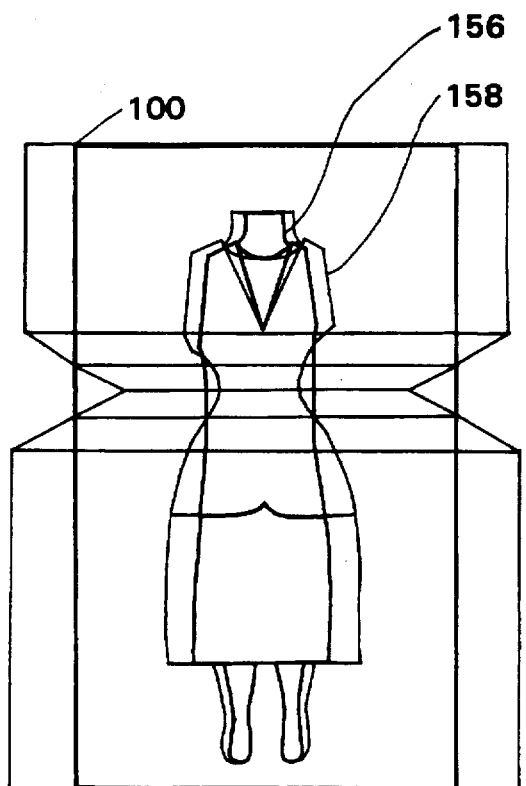
FIG. 27C shows the six destination quadrilaterals of the ensemble; the pixels of the six source rectangles (from FIG. 27B) are mapped into these six destination quadrilaterals; the ensemble is shown as it is warped. Thick lines relate to the unwarped source; thin lines relate to the warped destination.
Figure 28:
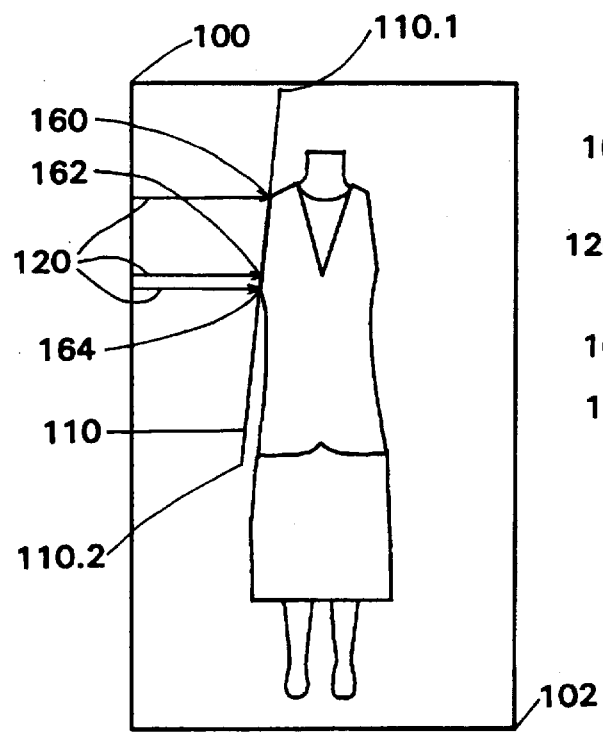
FIG. 28 depicts the process for scanning the unwarped ensemble along the left vector in order to determine the upper left, middle left and lower left "hit" points.
Figure 29:
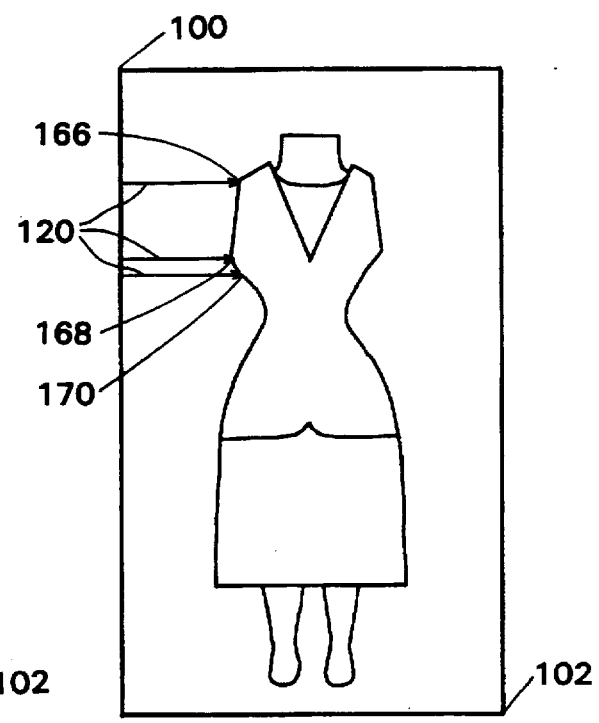
FIG. 29 depicts the process for scanning the warped ensemble along the Y lines (as determined in the process depicted in FIG. 28) in order to determine the warped ensemble's upper left, middle left and lower left X "hits".
Figure 30:
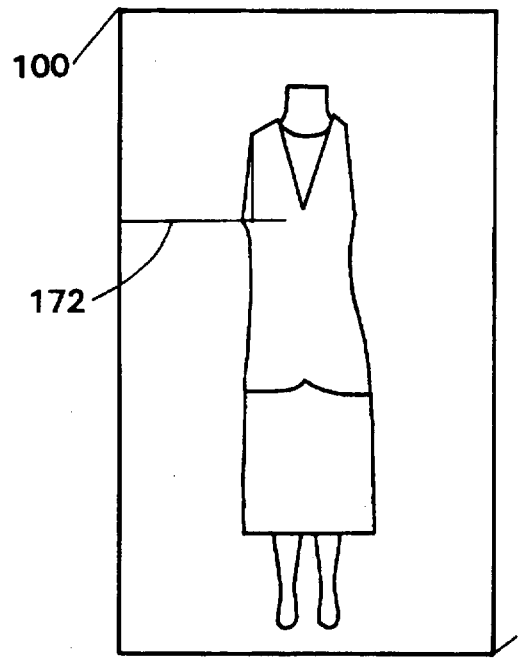
FIG. 30 and FIG. 30A illustrate the process for determining the height of the triangle used to calculate the original (unwarped) radian.
Figure 31:
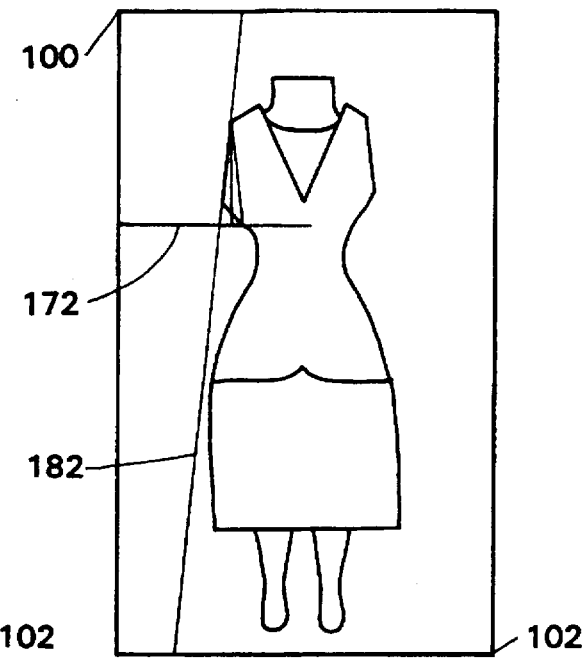
FIG. 31 and FIG. 31A illustrate the process for determining the height of the triangle used to calculate the warped radian.
Figure 30A:
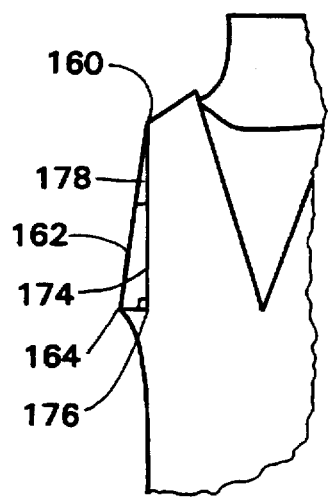
Figure 31A:
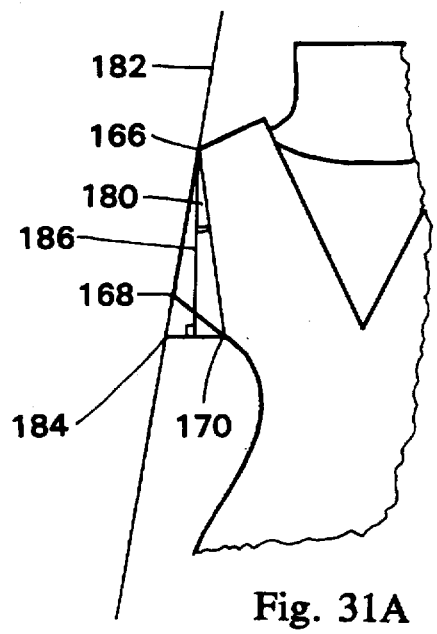
Figure 33A:
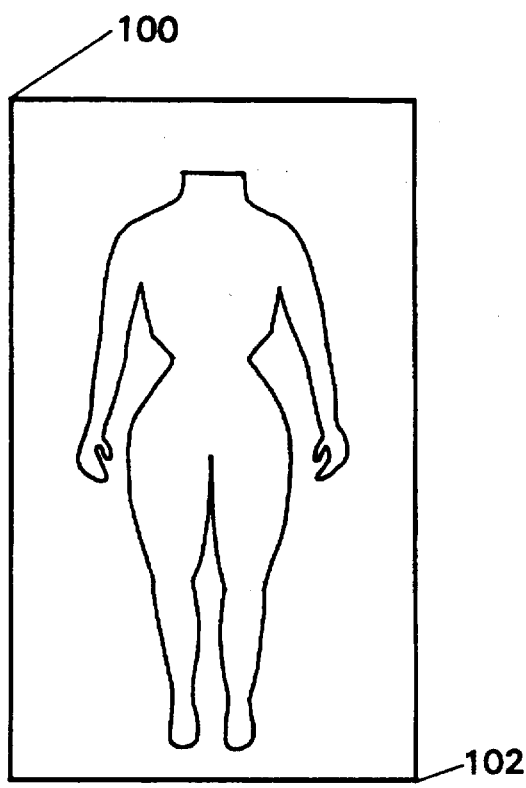
FIG. 33A shows a body that was reshaped in the absence of midriff and abdomen girth measurements.
Figure 33B:
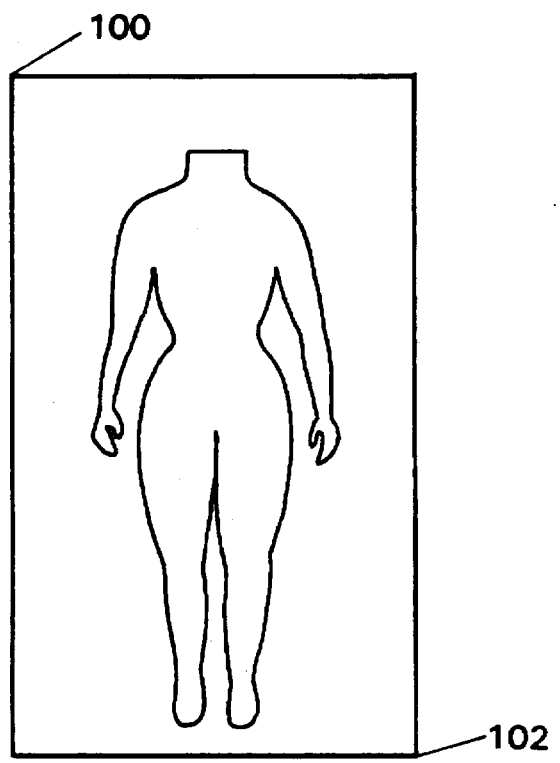
FIG. 33B shows a reshaped body, where a calculated (versus an inputted) midriff and abdomen were used.

SHAPE geometrically transforms (via WARP) an "armless" ensemble—with "fleshy" legs and a "fleshy" upper torso, but without arms/sleeves—so that it reflects a client's girth measurements (FIG. 27A through FIG. 27C). The function examines the amount of garment ease in the ensemble and thereby implements a more or less extreme geometric transformation. It also analyzes the clad, reshaped torso, and compares this with an analysis of the clad, unreshaped torso (FIG. 28), to determine where the arms/sleeves will be reattached (FIG. 29). SHAPE also extrapolates from the input bust, waist and hip measurements, and calculates appropriate midriff and abdomen measurements. FIG. 33A shows how the basic model body would be reshaped in the absence of midriff and abdomen girth measurements; note the "angularity" and lack of curviness around the midriff and abdomen areas. Contrast this with FIG. 33B, which shows a more rounded image, where calculated midriff and abdomen measurements are used.

Figure 34A:
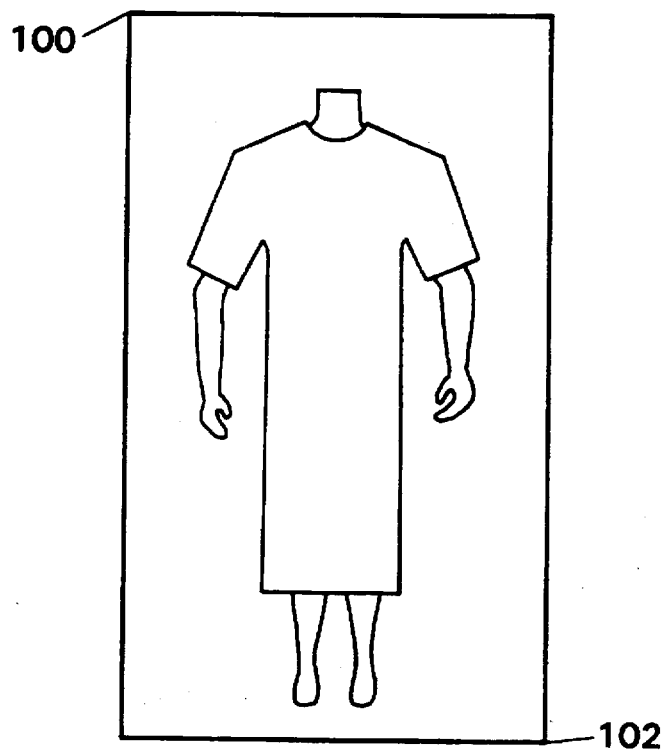
FIG. 34A shows a shift dress on the basic model body.
Figure 34B:
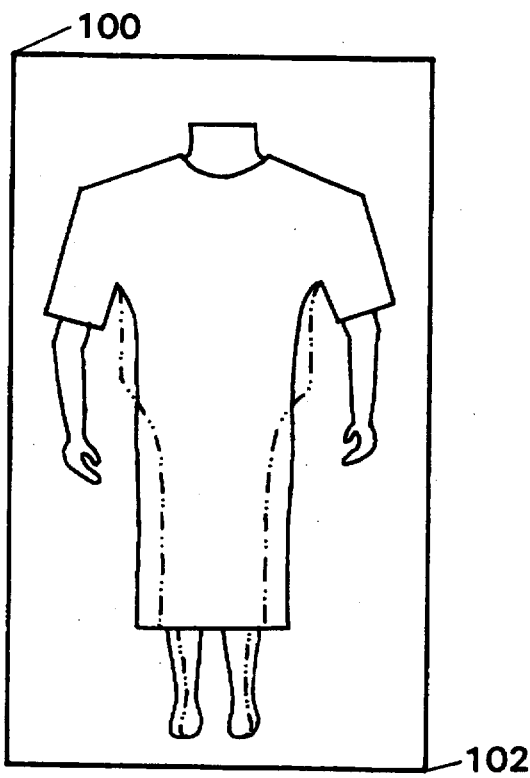
FIG. 34B shows the dress on a body with the bust measurement larger than the hip measurement; the phantom lines indicate the silhouette of the dress if girth measurements were not adjusted.
Figure 34C:
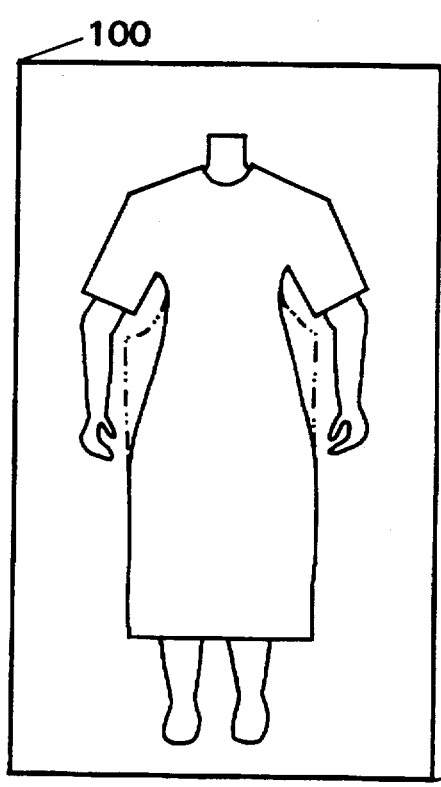
FIG. 34C shows the dress on a body with hips larger than the bust; the phantom lines indicate the silhouette of the dress if girth measurements were not adjusted.

Depending on the garment classification and the amount of garment ease, SHAPE will also recalculate, as necessary, midriff, waist, abdomen and hip measurements, so as to ensure a natural flow of the garment. FIG. 34A shows a shift dress on the basic model body; FIG. 34B shows the dress on the body with the bust measurement larger than the hip measurement; FIG. 34C shows the dress on a body with hips larger than the bust. Note that in FIG. 34B and FIG. 34C recalculated girth measurements result in more natural "shift" shapes; the phantom lines indicated how the ensembles would be reshaped in the absence of recalculated girths.

Figure 32:
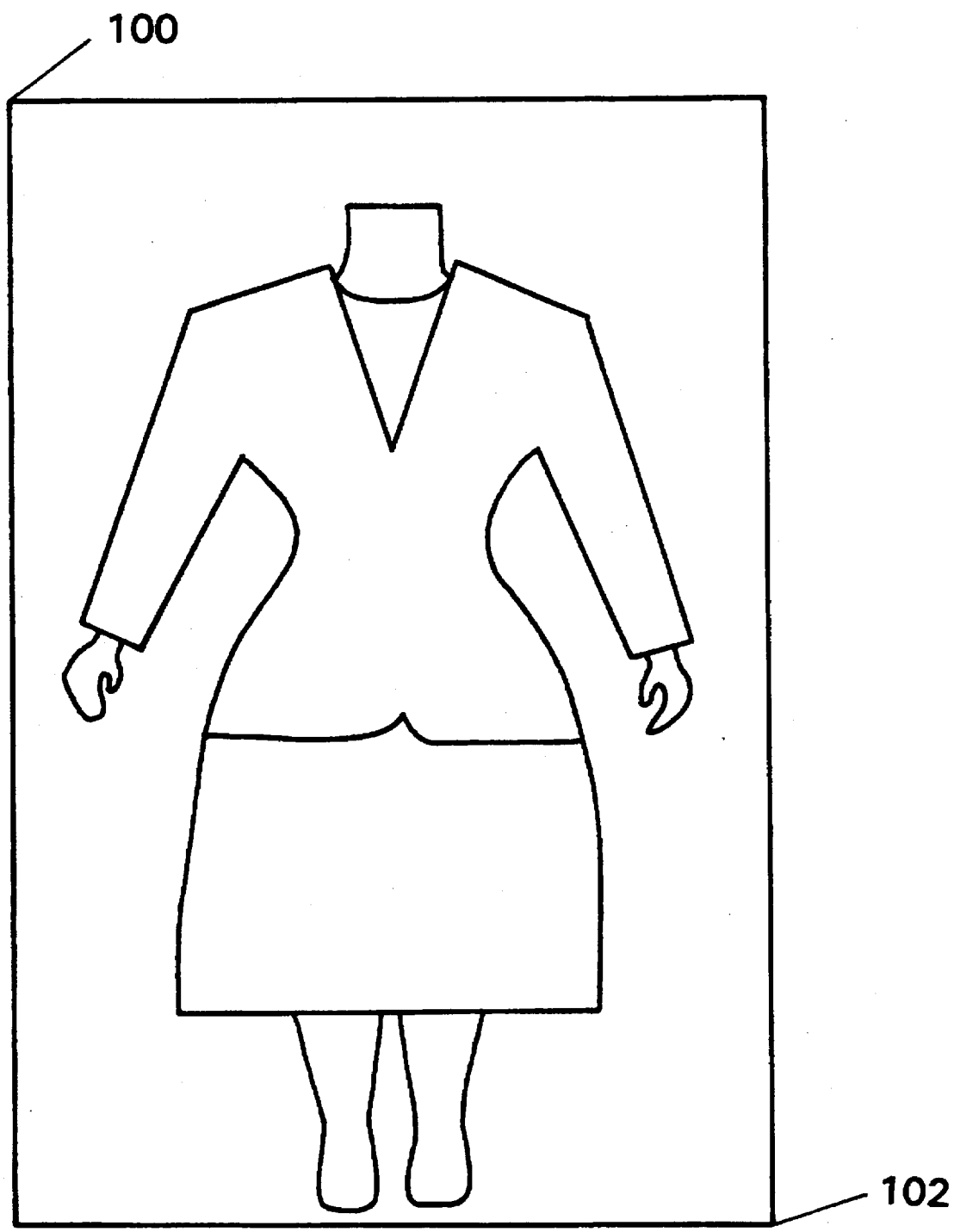
FIG. 32 shows the final image, complete with its arms reattached.

ATTACH calculates the trigonometric functions which are used to reattach the arms/sleeves, rotates them, as necessary, and translates them (FIG. 28 through FIG. 31A), as necessary, so that they seamlessly reattach to the reshaped torso (FIG. 32).

WARP takes the pixels from source rectangles and maps them into destination quadrilaterals, resulting in a reshaped bitmap image. Examples of WARPing are illustrated in FIG. 19, FIG. 25B, FIG. 25C, FIG. 27B and FIG. 27C. To keep things simple, the function uses the nearest neighbor interpolation method.

Please note that I do not prescribe any particular sequence of processing events, except as noted. To this extent, the ordering of the functions and processes in the flow chart (FIG. 39B) should be viewed as an example of a viable and operational embodiment, but not necessarily one that is conclusive.

Figure 35:
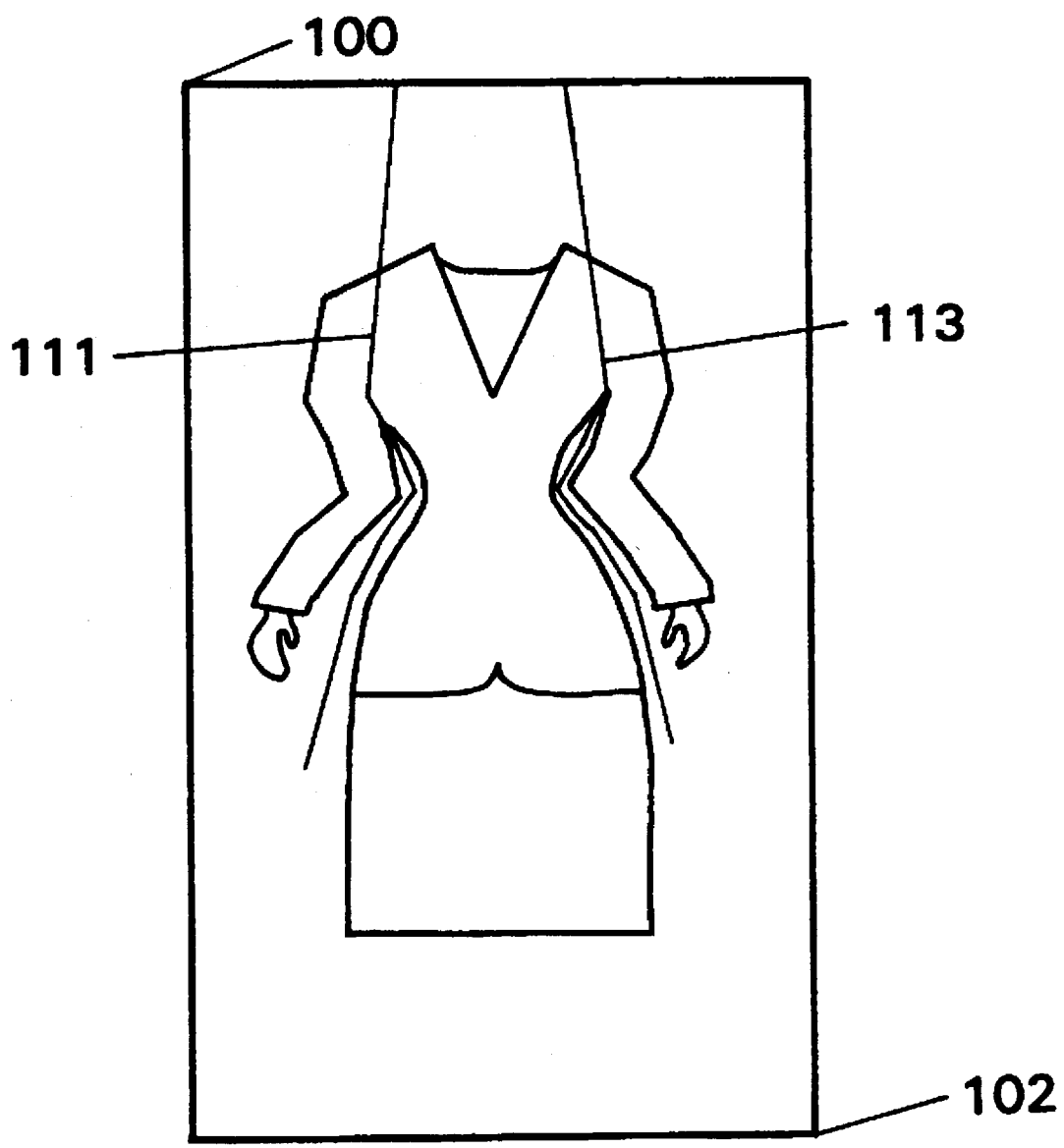
FIG. 35 illustrates an ensemble that was reshaped with its arms/sleeves left intact; distorted detachment vectors are also shown.

As I have repeatedly stressed, I am not prescribing any particular sequence to the processing of events. It is conceivable, for example, that another online embodiment would first individually shape all the layers of an ensemble and then layer them by trimming, correcting misalignments, centering the legs, etc. Another possible embodiment might shape the ensembles armful, i.e., leaving the arms/sleeves of ensembles intact, and then remove the distorted arms/sleeves along their distorted detachment vectors 111 and 113, and finally attach the arms/sleeves—as originally from the database—to the destination bitmap using the normal procedure (see FIG. 35). The important point is that there are many possible sequencing scenarios, no single one being inherently superior, which could easily be implemented by making minor adjustments to the process as I have described it above.

Figure 36C:
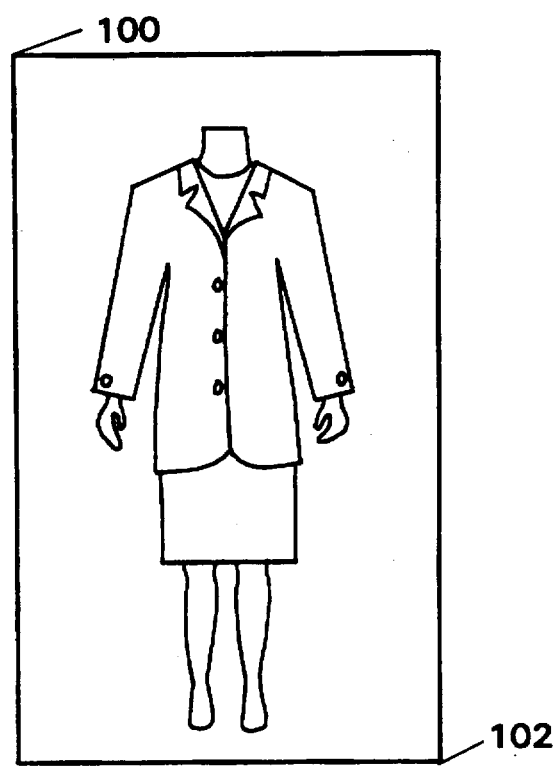
FIG. 36C illustrates both bodies (as in FIG. 36A and FIG. 36B) as they would appear if a loose fitting "shift" jacket were put over the dress.

Accordingly, the reader can see that I have configured a system which allows a client to "try on" off-the-shelf clothing without physically dressing and viewing himself/herself in the mirror. My system establishes a relationship between a client's measurements (such as bust, waist, hips, and height) and an ensemble as selected from a database of digitized garment images, and then renders an image that reflects the client's specific physique. The system itself makes no value judgments as to whether or not a given ensemble is appropriate for a person with a particular measurements; the client makes his/her own judgment. So if, for example, a client has the following measurements—92 cm (bust variance 12), 81 cm (waist variance 24), and 97 cm (hip variance 12)—and picks a skimpy, tight-fitting dress from the database, the system will render the client's image and only advise the client as to her correct size, with no further comment. The system does not stop here—it also allows a client to mix and match different tops and jackets with bottoms like skirts and even over dresses. Returning to the above example, if the client cares to "try on" a sports jacket that fits loosely around the waist, she tells the system to render her image using the dress/jacket combination. Again, the system makes no judgments; the client herself may decide that the dress/jacket combination ensemble might make more sense than the sole dress. FIG. 36B shows a body with the above measurements in the dress; FIG. 36C illustrates the body as it would appear if a loose "shift" jacket were layered over the dress.

Some of the more obvious applications of my system are as follows: interactive catalogue shopping, at home on a PC, perhaps over a network like PRODIGY or COMPUSERVE; an alternative to conventional dressing rooms in department stores where the system may be installed; and interactive home shopping as soon as high definition TV becomes available. All of these uses could result in increased advertising and exposure for the respective merchandisers, designers and manufacturers of the apparel and accessories.

This prototype was developed on a standalone SUN workstation under the UNIX (SunOS 4.0.2) operating system. All of the source code is in the C programming language. I chose UNIX over other operating systems because of its ability to handle complex and memory intensive image processing, its portability and interoperability, the richness of its utilities, and because of its reliability.

The image processing techniques that I employ—including transformations, translations, rotations, and stencilling operations, etc.—have been widely used in myriad applications in medicine, the defense industry, manufacturing, science and more. As I hope I have demonstrated, I have reconfigured and crafted these techniques to create a new and useful invention that can be used by many people of various stripes, both privately and in business; moreover, my system is efficient, extremely flexible, and cost-effective. In short, I have invented the digital dressing room.

Although the description above contains many specifications, these should not be construed as limiting the scope of the invention but as merely providing illustrations of some of the presently preferred embodiments of this invention. For example, currently this system is for a gray scale (black and white) prototype. When this program was conceived, the requisite hardware and software was still quite costly. My position then was that the validity and the truth of the idea could be developed, tested, and processed in gray scale and that color is above all an enhancement. In a word, modifying this prototype to include full color will be painless and speedy. Except for the operating system, all of the tools used to develop this prototype have been developed in-house. For practical purposes, what this has meant is that I have had to impose a strict limit on the quantity and diversity of styles that I have included in the prototype's database. So even though this prototype has been tested on only "misses" bodies with a limited number of styles, the system can easily be expanded to include the broad range of styles and sizes currently available in the marketplace, for both male and female forms.

Other specifications which should not be construed as limitations include the following: the system need not be tied to any particular computer operating system such as UNIX; the fact that it was written in the C programming language was merely a convenience; my programming style reflects a personal approach which is not germane to the underlying system itself; the particular digital warping algorithms and interpolation methods that I employ were used mainly to keep the program as simple and comprehensible as possible; the manner in which garments are classified and processed (to determine and reflect garment ease) is simplified so as to make this specification more lucid; the fact that I do not show the client's face in the final image means only that I have chosen not to make any claims with respect to the face, but it does not mean that my system cannot easily include provisions for client faces; any particular sequence of processing events is either fortuitous or a matter of convenience, except as noted; the online process can be easily expanded to allow for more than two garment layers, etc.

Thus the scope of this invention should be determined by the appended claims and their legal equivalents, rather than by the examples given.

I claim:

1. A process for altering source data into destination data within a programmable electronic device including a memory and a display device, said process comprising the computer-implemented steps of:

storing source data in the memory of the programmable electronic device, said source data comprising a model image layer having a human shape and comprising at least one predetermined body measurement, said source data also comprising a garment image layer having at least one garment measurement, said garment image layer being characterized by its ability to be altered in accordance with an altered shape of its corresponding model image layer, thereby establishing a predetermined relationship between said model image layer and said garment image layer;

inputting into the programmable electronic device at least one independent corresponding measurement which corresponds to at least one of the one or more predetermined body measurements, whereby the one or more inputted independent corresponding measurements may differ from the one or more predetermined body measurements of said model image layer;

and generating destination data using a process comprising:

generating a destination image from a source image, said source image representing a combination of said model image layer, as derived from said source data, and said garment image layer, also as derived from said source data, by altering, through at least one of transformations, translations and/or edge detections, said source image according to the one or more inputted independent corresponding measurements, wherein said source image is altered into said destination image by calculating whether there exist any differences between said predetermined measurements and independent corresponding measurements, and, using these differences, spatially rearranging the pixels of the source image into the destination image, wherein said independent corresponding measurements are modified by analyzing predetermined areas of the garment image layer, and thereby determining the existence of ease in said areas in order to produce modified differences, such that if said source image is displayed on the display device, it represents a human shape wearing said garment; or generating a destination image from said model image layer, as derived from said source data, and said garment image layer, also as derived from said source data, by altering, through at least one of transformations, translations and/or edge detections, each of said model image layer and said garment image layer, according to the one or more inputted independent corresponding measurements, wherein said model and garment image layers are altered separately, by calculating whether there exist any differences between said predetermined measurements and independent corresponding measurements, and, using these differences, spatially rearranging the pixels of said garment image layer, wherein said independent corresponding measurements are modified by analyzing predetermined areas of the garment image layer, and thereby determining the existence of ease in said areas in order to produce modified differences, and spatially rearranging the pixels of said model image layer by using modified differences, and then combining an altered garment image layer and an altered model image layer into said destination image, such that the destination image represents a human shape wearing said garment.

2. The process in claim 1 wherein the source image comprises a predetermined bitmap image.

3. The process in claim 2 wherein the source image comprises a plurality of individual source image layers, each of which is reshaped into a plurality of individual destination image layers, such that the individual destination image layers can be combined to form the destination image.

4. The process in claim 1 wherein said source image is reshaped into said destination image by calculating whether there exist any differences between said predetermined measurements and independent corresponding measurements, and, using these differences, spatially rearranging the pixels of the source image into the destination image which reflects the differences.

5. The process in claim 4 wherein said independent corresponding measurements are modified by analyzing predetermined areas of the garment image, and thereby determining the existence of ease in said areas, to produce modified differences, whereby the source image is reshaped so as to produce a destination image which reflects the modified differences.

6. The process in claim 1 wherein said source has predetermined sets of source control points, with each set of source control points constituting a source region; and a further process for establishing corresponding sets of destination control points, said sets of destination control points being determined by calculating any differences between said predetermined measurements and independent corresponding measurements, each set of destination control points constituting a destination region; and spatially rearranging the pixels of each source region, so that each source region's pixels are mapped into each corresponding destination region, whereby the destination regions will comprise a destination reflecting the source's remapped pixels.

7. The process in claim 6 wherein said independent corresponding measurements are modified by analyzing predetermined areas of said garment image, and determining the amount of ease in said areas, to provide modified destination control points, and modified destination regions, whereby a modified mapping is implemented.

8. The processes in claim 1 wherein said source contains at least one appendage or appurtenance which has been isolated from the source by a further process in which said at least one appendage or appurtenance is delineated from the balance of the source, so that reshaping of the source is restricted to areas of the source not containing the at least one appendage or appurtenance, whereby the destination image does not have reshaped appendages and appurtenances.

9. The process in claim 8 wherein said appendages and appurtenances are isolated from said source along detachment vectors of the source, said vectors being delineated in the source.

10. The process in claim 9 wherein any arms and sleeves of said source comprise said appendages and appurtenances.

11. The process in claim 1 wherein said source contains appendages and appurtenances, which have been isolated from the source by a further process in which said appendages and appurtenances are delineated from the balance of the source where said reshaping of the source includes reshaping of said appendages and appurtenances, resulting in a destination with transformed appendages and appurtenances.

12. The process in claim 11 wherein said transformed appendages and appurtenances in the destination have been delineated and isolated from the balance of the destination such that areas of said destination containing transformed appendages and appurtenances are detached, whereby said destination does not contain transformed appendages and appurtenances.

13. The process in claim 12 wherein said transformed appendages and appurtenances are isolated from said destination by an analysis of predetermined vectors of the source which have been delineated in the source and being transformed into distorted vectors of the destination, the destination's vectors having become distorted as a result of said reshaping of the source, the purpose of said analysis being to detach transformed appendages and appurtenances which are delineated by the distorted vectors.

14. The process in claim 13 wherein arms and sleeves of said source and said destination comprise said appendages and appurtenances.

15. The process in claim 1 wherein said source contains certain appendages and appurtenances, which have been detached from the source by a further process in which said appendages and appurtenances have been delineated from the remaining portion of the source, and identified as separate entities of the source, and a further process by which said appendages and appurtenances are attached onto said destination by at least one of rotation and translation so that said appendages and appurtenances become aligned along a line segment in the destination, said line segment determined by said reshaping of the source, whereby a reshaped source with untransformed by aligned appendages and appurtenances is the result.

16. The process in claim 15 wherein said appendages and appurtenances are detached from said source along predetermined vectors of the source, said vectors having been delineated in the source, and a further process wherein coordinates which define said vectors are compared to a set of coordinates which define said line segment in the destination, whereby the appendages and appurtenances are processed so that they will re-attach correctly to the destination.

17. The process in claim 16 wherein arms and sleeves of said source define said appendages and appurtenances.

18. The process in claim 1 wherein any misalignments of any image layer to any other image layer are corrected by analyzing areas of image layers, and then by at least one of rotating and translating of said image layers, whereby all image layers are naturally aligned.

19. The process in claim 18 wherein the legs of a body image layer are made to extend correctly from under a garment image layer, by translating that portion of the body image layer which is located below a selected line, said line running parallel to the X axis, whereby the legs of the body image layer are centered under and extend symmetrically from under garment image layers.

20. The process in claim 1 wherein a first image layer lying under a second image layer is processed by at least one of trimming and transforming said first image layer.

21. The process in claim 20 wherein image layers are processed by detecting outer edges of a second image layer; and by trimming said first image layer along said outer edges, whereby said first image layer lying under said second image layer will fit thereunder.

22. The process in claim 21 wherein garment image layers are processed by detecting outer edges of a second garment image layer; and by trimming said first garment image layer along said outer edges, whereby said first garment image layer lying under said second garment image layer will fit thereunder.

23. The process in claim 21 wherein a body image layer is processed by detecting outer edges of a top garment image layer under which a body image layer will lie, and by trimming the body image layer along said outer edges, whereby the body image layer lying under said top garment image layer will fit thereunder.

24. The process in claim 23 wherein said body image layer contains regions which have been detached from the body image wherein said regions have been delineated from the remaining portion of the body image layer, and therefore identified as separate entities of the body image layer, so that the body image layer is trimmed and lies under said top garment image layer.

25. The process in claim 24 wherein said regions are isolated from said body image layer along detachment vectors of said top garment image layer, said vectors having been delineated in the top garment image layer, the purpose of said vectors being to define outer edges of the body image layer and thereby to define an area of the body image layer, such that said area is detached from the remaining area of the body image layer.

26. The process in claim 25 wherein arms of said body image layer comprise said regions.

27. The process in claim 37 wherein any jaggies resulting from layering image layers on top of each other, are corrected by at least one of trimming, translation and transformation, whereby all image layers are positioned with respect to all other image layers.

28. The process in claim 27 wherein under garment layers are modified by identifying a garment image layer under which under garment image layers will lie, and by at least one of transforming and translating, the portion of said under garment image layers located below a line, said line running parallel to the X axis, whereby all under garment layers would appear natural and would not create jagged edges on either side of said garment image layer under which under garment image layers will lie, when said garment image layer is layered on top of the modified under garment image layer.

29. The process in claim 27 wherein under garment image layers are modified by identifying a garment image layer under which garment image layers will lie, and by at least one of trimming and transforming, the portion of said under garment image layers located above a line, said line running parallel to the X axis, whereby all under garment image layers would appear natural and would not extend from under said garment image layer under which under garment layers will lie, when said garment image layer is layered on top of the modified garment image layers.

30. The process in claim 1 wherein a body image layer has a predetermined height and is transformed to render a destination representing a body image layer of specific height.

31. The process in claim 30 wherein a region of said body layer having said height is transformed, said region which has been transformed being attached to the remaining region of the body image layer, said remaining region not having been transformed, whereby a destination body image layer reflects a height which differs from that of said body layer.

32. The process in claim 1 wherein a predetermined garment classification is ascribed to each garment image layer of said source as an input to the process, and, if said process will be operating on a source comprised of a plurality of garment image layers, a further process which analyzes and determines an ease relationship among said garment image layers of the source, and ascribes to the source a singular classification indicative of said ease relationship, whereby a source comprised of a plurality of garment image layers is ascribed a singular classification.

33. The process in claim 32 wherein client body girth measurements are given as inputs and based on an analysis of said inputs, including client body girth measurements and the classification of the source, a further process for altering client body girth measurements which are given as inputs and for calculating certain client body girth measurements which are not given as inputs.

34. The processes in claim 33 wherein client bust, waist and hip girth measurements comprise said client body girth measurements which are given as inputs, with the client bust girth measurement indicative of a client bust variance, the client waist girth measurement indicative of a client waist variance, and the client hip girth measurement indicative of a client hip variance, with substitute client hip and waist girth measurements being calculated, and with a calculated client abdomen girth measurement and a calculated client midriff girth measurement, with calculations of girth measurements being selected from the group of calculation conditions consisting of:

if the classification that was ascribed to said source is a shift classification and the inputted client bust girth measurement is greater than or equal to the inputted client hip girth measurement, then the inputted client waist girth measurement is ignored and a substitute client waist variance is calculated by taking the simple average of the client bust variance and the client hip variance, resulting in a substitute client waist variance which reflects a replacement client waist girth measurement; then a client abdomen variance is set equal to the client waist variance, resulting in a newly calculated client abdomen girth measurement which was not given as an input; and then the inputted client hip girth measurement is ignored and a substitute client hip variance is set equal to the client waist variance, resulting in a substitute client hip variance which reflects a replacement client hip girth measurement;

if the classification that was ascribed to the source is a shift classification and the inputted client bust girth measurement is less than the inputted client hip girth measurement, then the inputted client waist girth measurement is ignored and a substitute client waist variance is calculated by taking the simple average of the client bust variance and the client hip variance, resulting in a substitute client waist variance which reflects a replacement client waist girth measurement; and then a client abdomen variance is calculated by taking the simple average of the client waist variance and the client hip variance, resulting in a newly calculated client abdomen girth measurement which was not given as an input; if the classification that was ascribed to said source is a shift classification, then a client midriff variance is calculated by taking the simple average of the client bust variance and the client waist variance, resulting in a newly calculated client midriff girth measurement which was not given as an input;

if the classification that was ascribed to said source is a fitted classification, then a client midriff variance is calculated by taking the simple average of the client bust variance and the client waist variance, resulting in a newly calculated client midriff girth measurement which was not given as an input; and, if the classification that was ascribed to said source is a fitted classification, then a client abdomen variance is calculated by taking the simple average of the client waist variance and the client hip variance, resulting in a newly calculated client abdomen girth measurement which was not given as an input.

* * * * *

UNITED STATES PATENT AND TRADEMARK OFFICE
CERTIFICATE OF CORRECTION

PATENT NO. : 5,680,528
DATED : October 21, 1997
INVENTOR(S) : Henry A. Korszun

It is certified that error appears in the above-identified patent and that said Letters Patent is hereby corrected as shown below:

At Column 18, line 58, "modified" should be replaced with --unmodified--.

At Column 21, line 16, "claim 37" should be replaced with --claim 1--.

Signed and Sealed this

Sixth Day of January, 1998

Attest:

Attesting Officer

BRUCE LEHMAN
Commissioner of Patents and Trademarks